Nov. 10, 1970  L. MACROW  3,538,657
GAS-LIQUID CONTACT APPARATUS
Filed Dec. 26, 1968 11 Sheets-Sheet 3
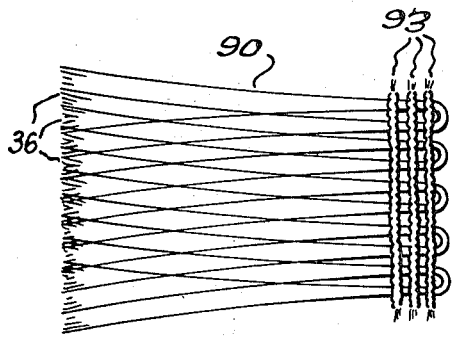
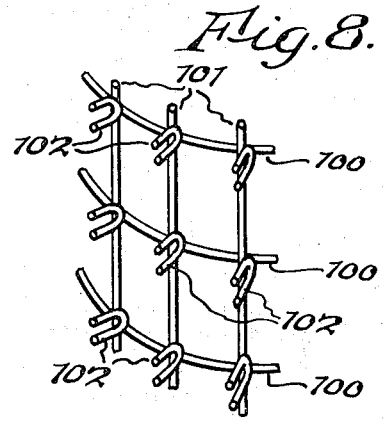
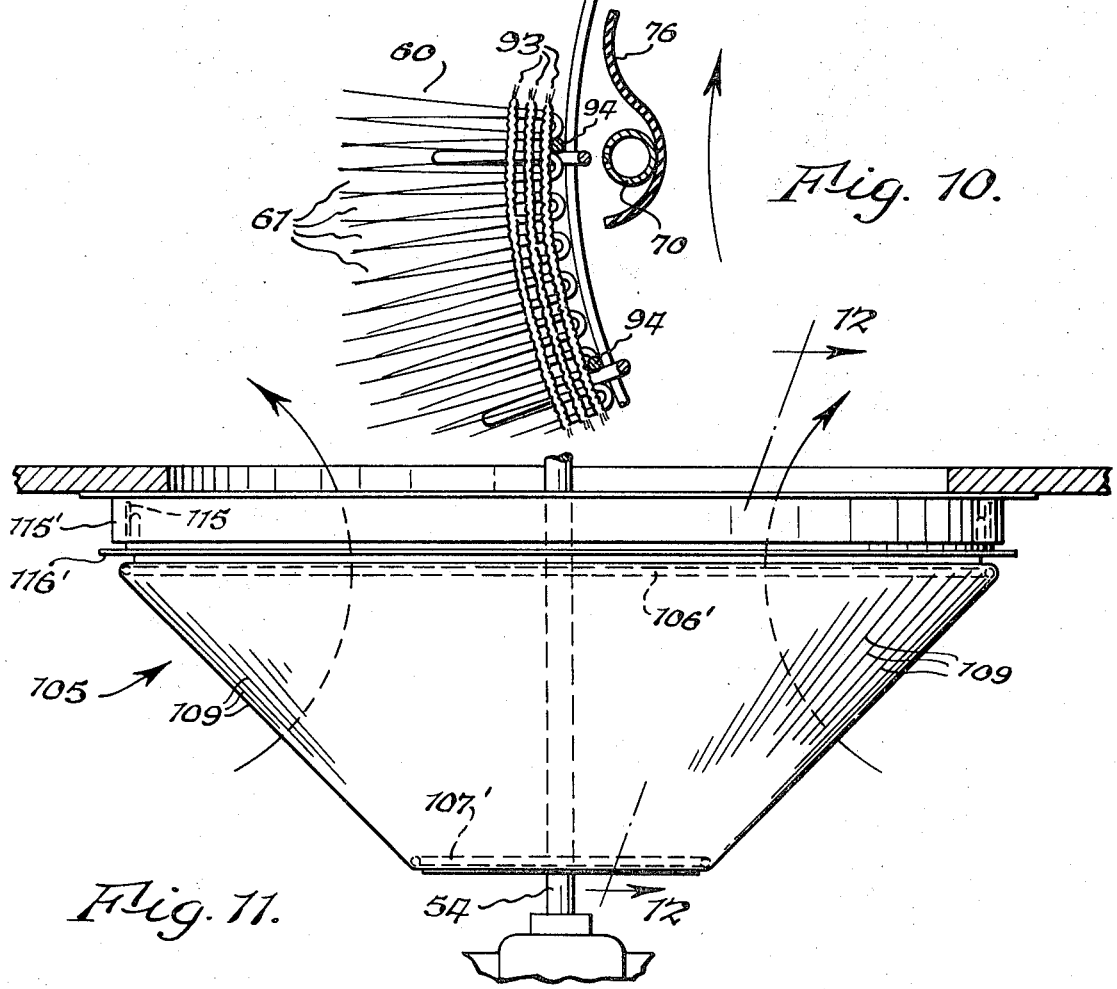
INVENTOR.
Lawrence Macrow
BY
Joseph P. Gastel
ATTORNEY.

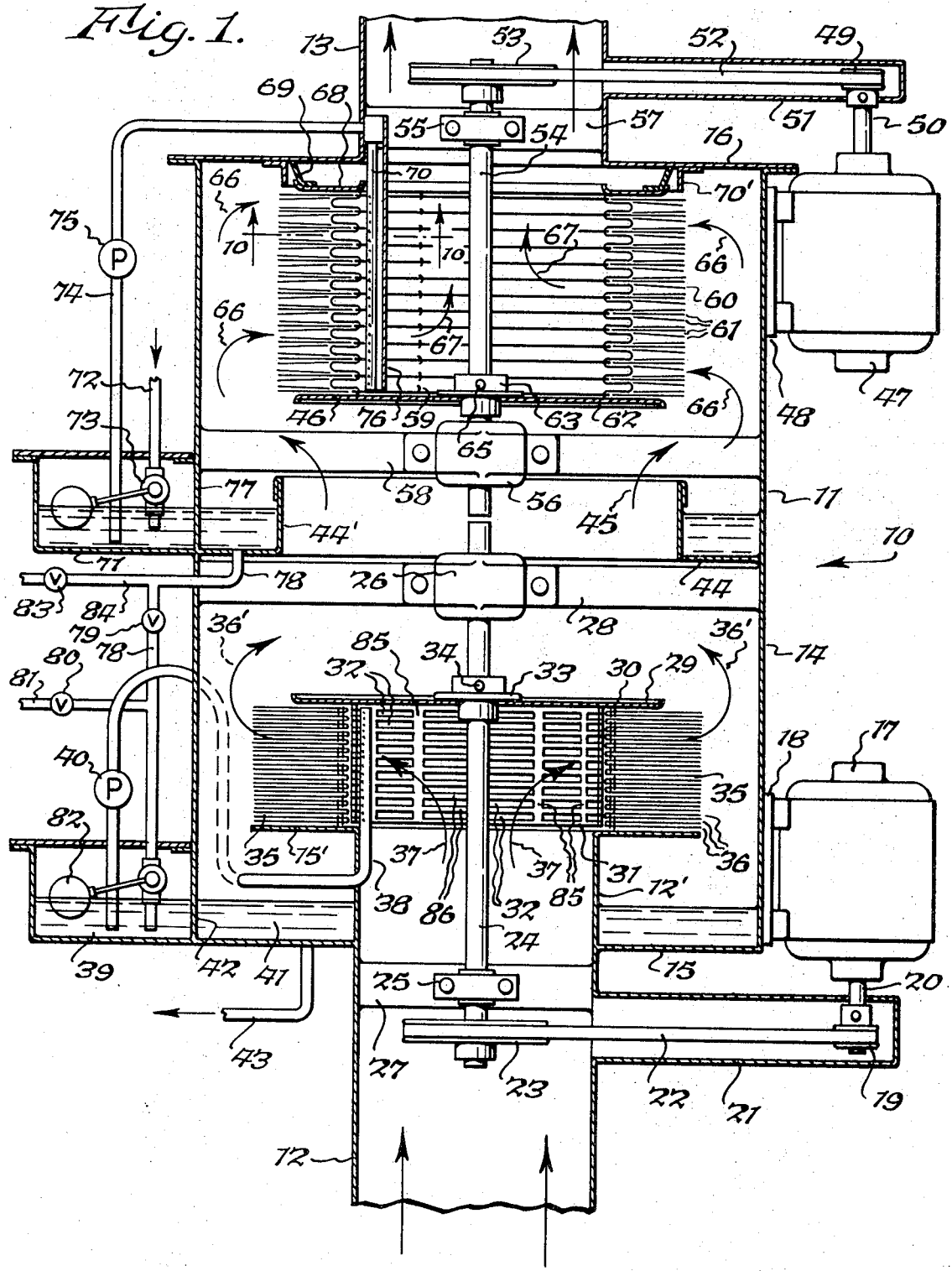

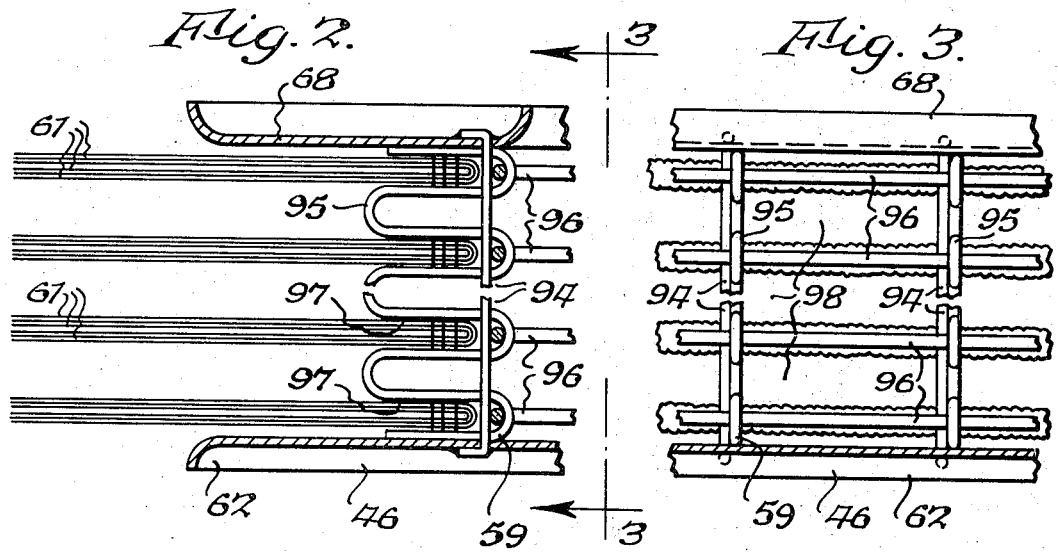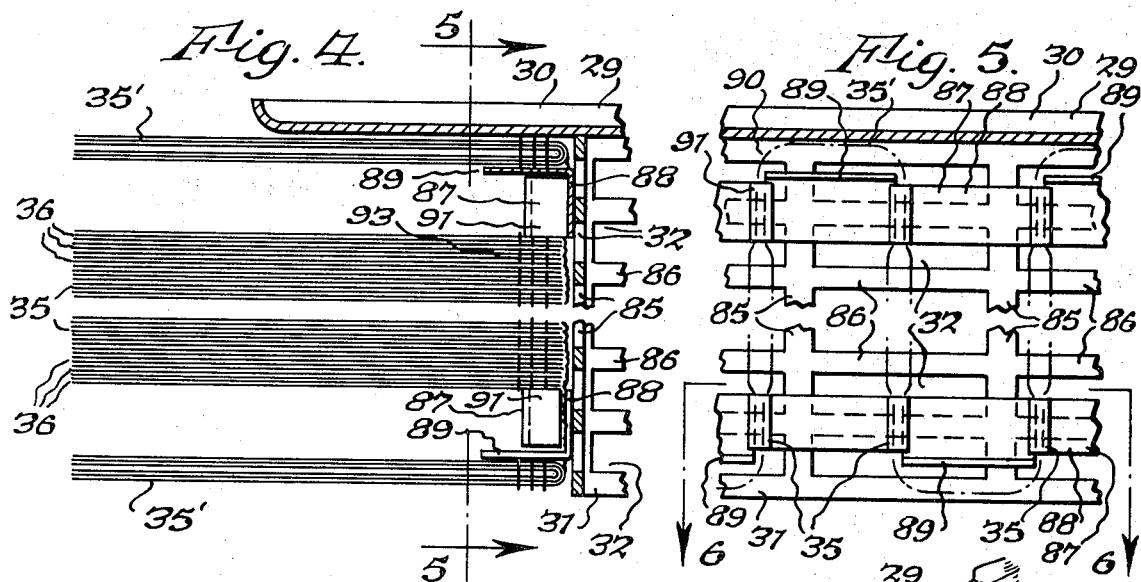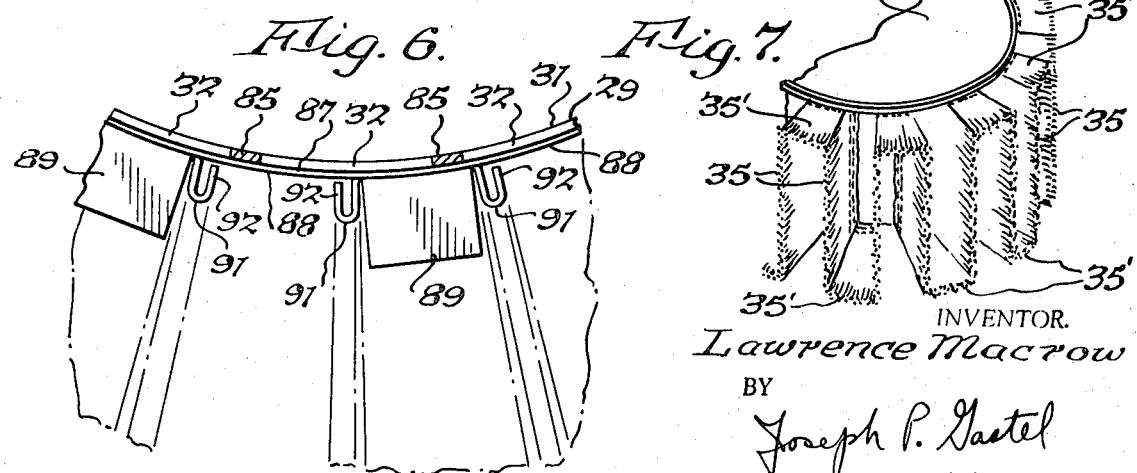

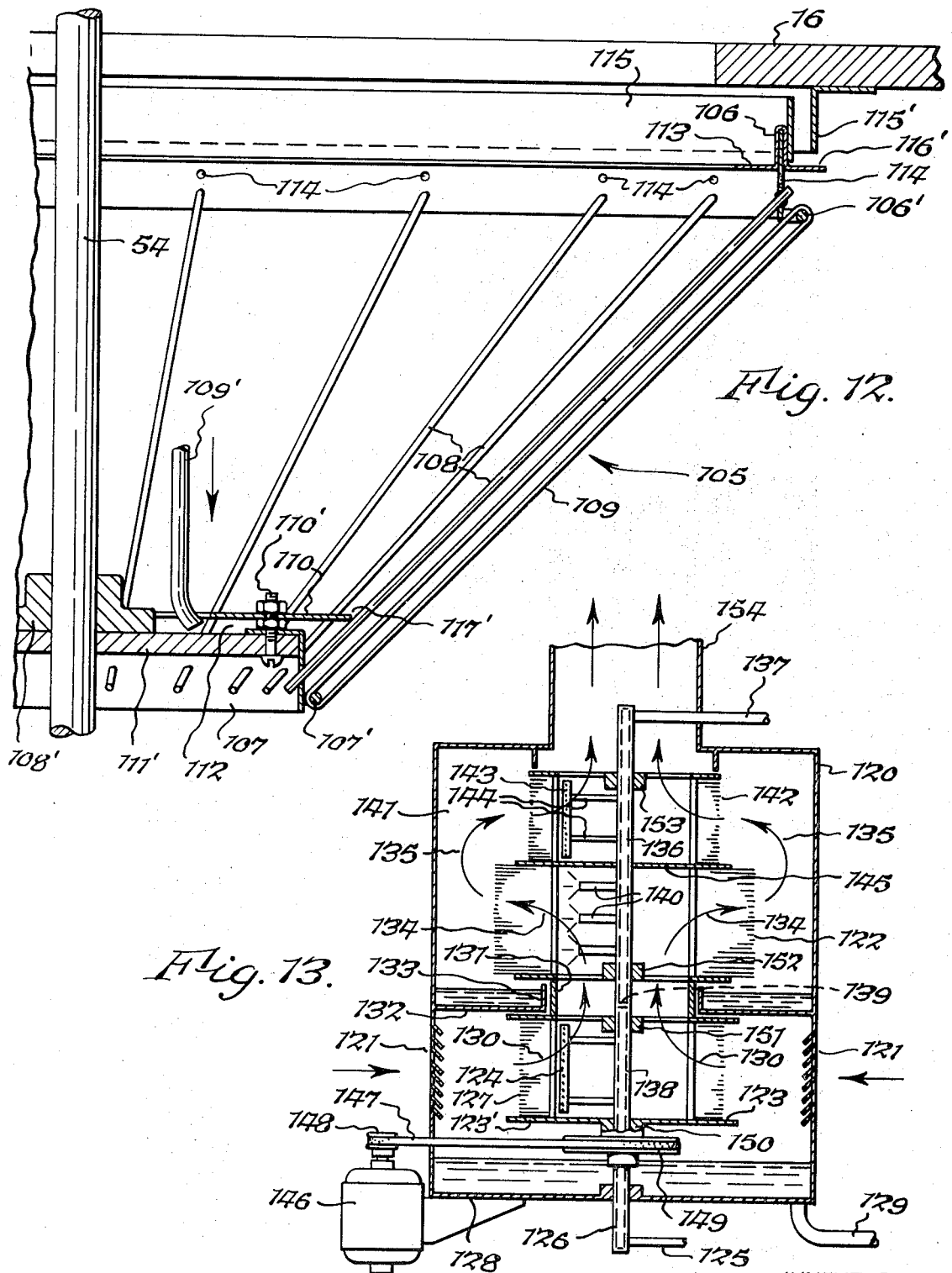

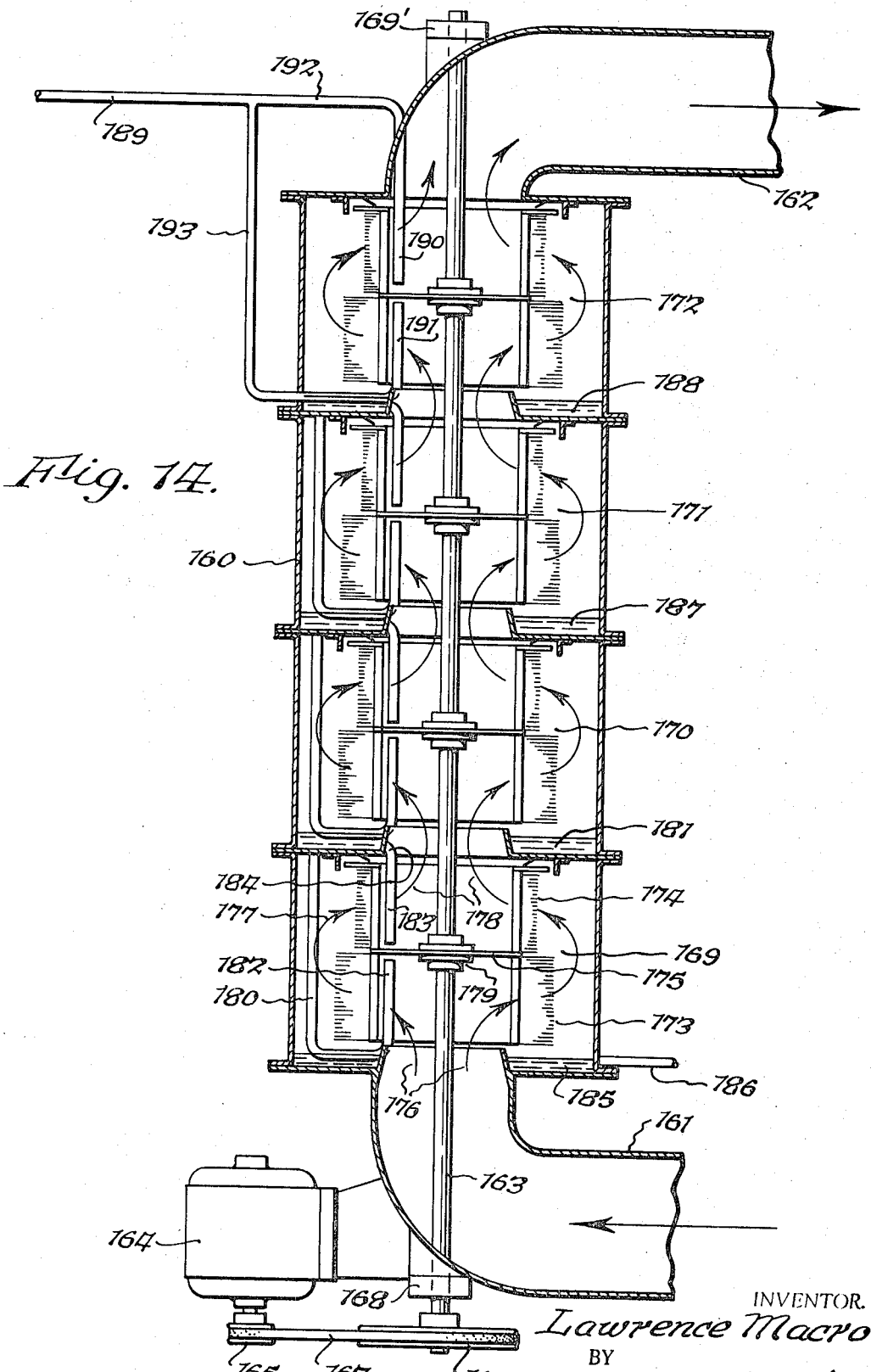

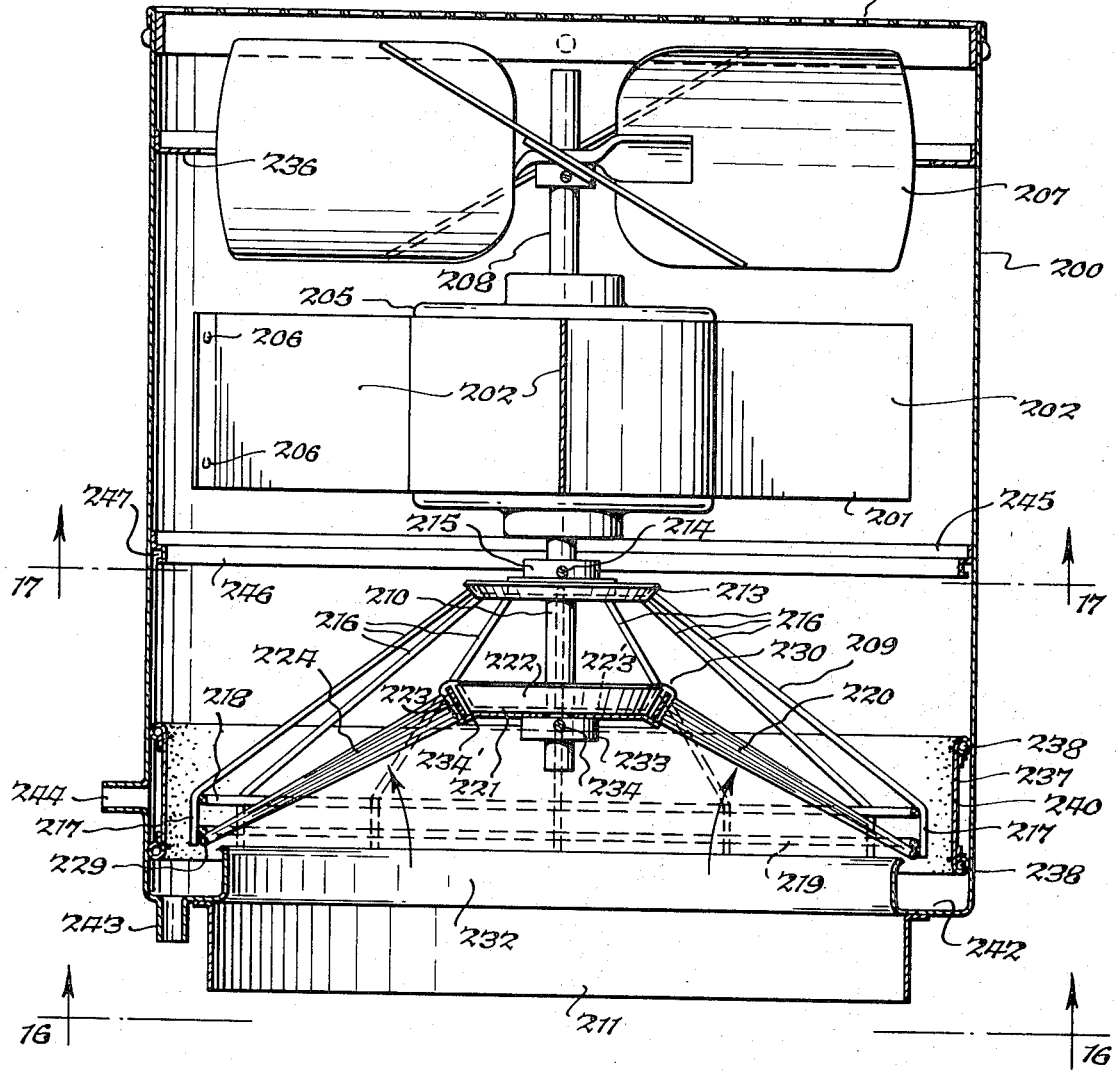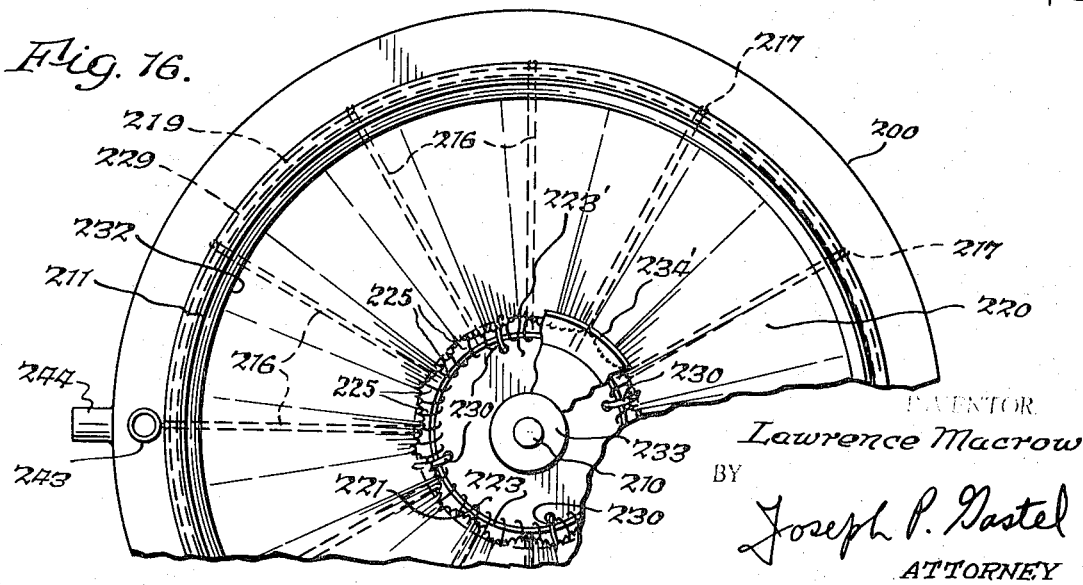

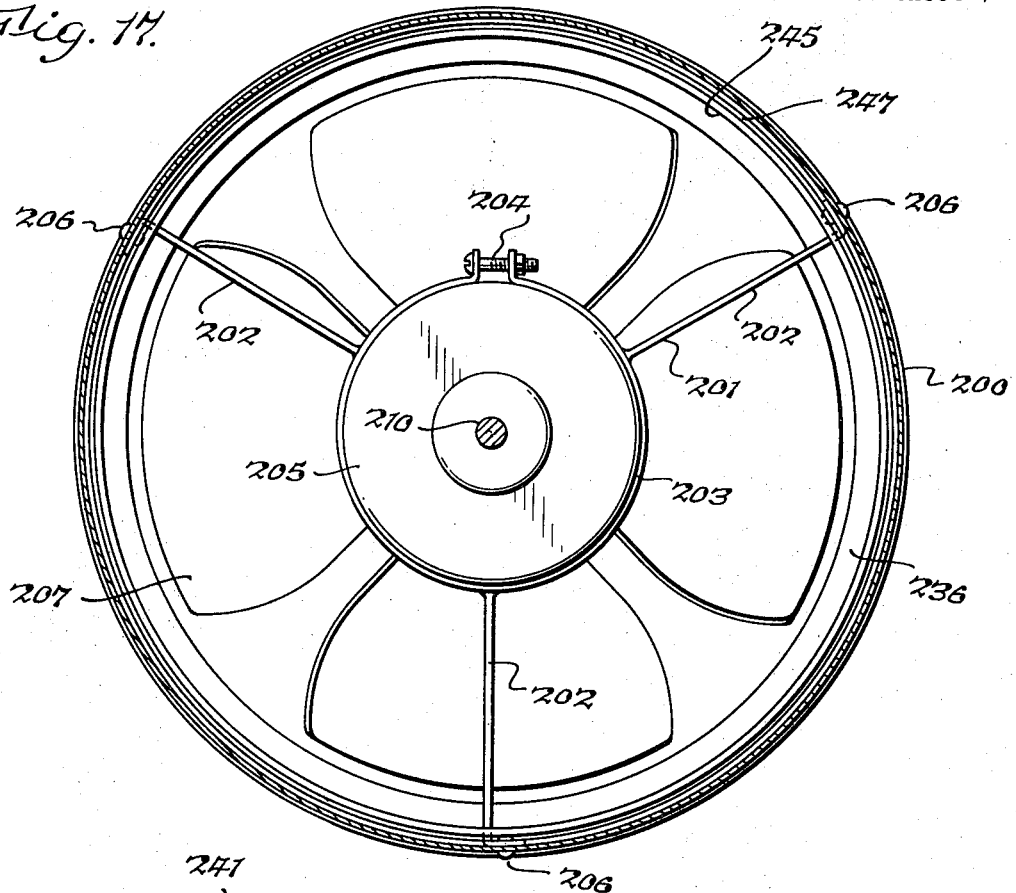
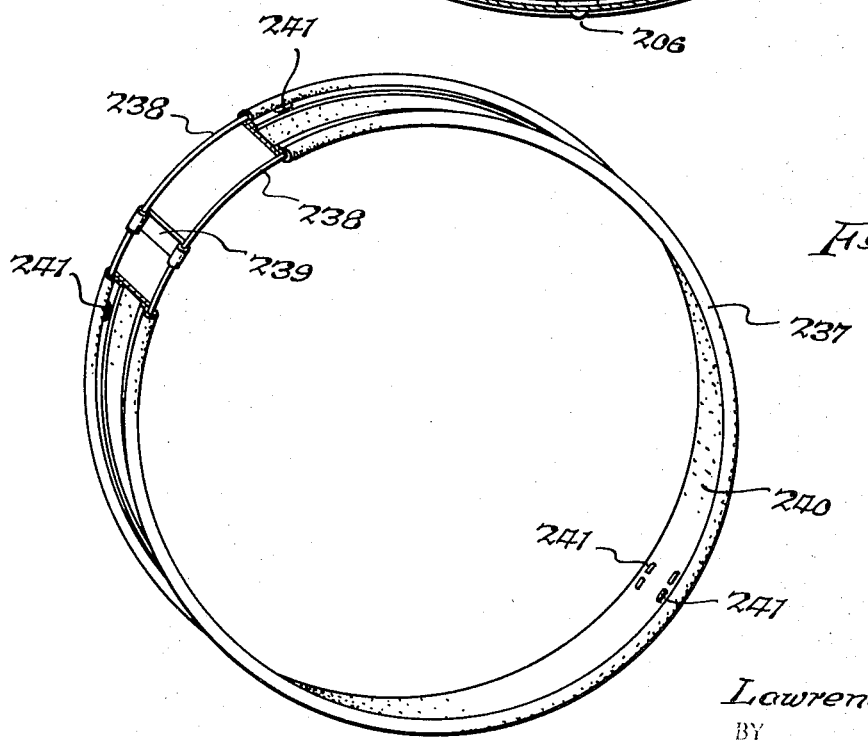

Nov. 10, 1970 L. MACROW 3,538,657
GAS-LIQUID CONTACT APPARATUS
Filed Dec. 26, 1968 11 Sheets-Sheet 8

INVENTOR.
Lawrence Macrow
BY
Joseph P. Gastel
ATTORNEY.

Nov. 10, 1970 — L. MACROW — 3,538,657
GAS-LIQUID CONTACT APPARATUS
Filed Dec. 26, 1968 — 11 Sheets-Sheet 9

INVENTOR.
Lawrence Macrow
BY
Joseph P. Gastel
ATTORNEY.

Nov. 10, 1970 L. MACROW 3,538,657
GAS-LIQUID CONTACT APPARATUS
Filed Dec. 26, 1968 11 Sheets-Sheet 11

INVENTOR.
Lawrence Macrow
BY
Joseph P. Gastel
ATTORNEY.

United States Patent Office 3,538,657
Patented Nov. 10, 1970

3,538,657
GAS-LIQUID CONTACT APPARATUS
Lawrence Macrow, 481 Chair Factory Road,
Elma, N.Y. 14059
Continuation-in-part of application Ser. No. 521,774,
Jan. 20, 1966. This application Dec. 26, 1968, Ser.
No. 805,067
Int. Cl. B01f 3/04
U.S. Cl. 55—231          27 Claims

ABSTRACT OF THE DISCLOSURE

A multistage gas-liquid contact apparatus including a housing having two drums therein, the first drum having a first apertured shell with filaments in the form of fan vanes thereon, and means for depositing water on the first drum and causing air to pass through the drum to provide a first stage of gas-liquid contact as well as providing air movement, and a second drum having a second apertured shell with filaments thereon and providing less of a fan effect than the first drum, and means for depositing liquid on the second drum to provide a second stage of gas-liquid contact for the gas being pumped by the first drum, the housing directing the gas radially inwardly into the second drum thereby to eliminate the liquid therefrom by the centrifugal force produced by the second drum. The second shell may have the filaments extending radially outwardly or may be frusto-conical in shape with the filaments extending along the surface. The second drum may be supplied with liquid or may be caused to run dry and thus function solely as an eliminator. The first gas-liquid contact stage may be eliminated or may be replaced by a fan and the second drum may be run dry, thereby causing the entire device to function as a mist eliminator for separating an entrained liquid from a gas.

CROSS REFERENCE TO RELATED APPLICATION

The present application is a continuation-in-part of application Ser. No. 521,774, filed Jan. 20, 1966, and now abandoned.

BACKGROUND OF THE INVENTION

The present invention relates to an improved multistage gas-liquid contact apparatus for effecting intimate contact between a gas and a liquid without significant entraining of said liquid in said gas and without experiencing substantial pressure drops of the gas passing through the apparatus. The present invention also relates to an improved mist eliminator for separating an entrained liquid from a gas.

In the past various types of gas-liquid contact apparatus have been utilized in various applications, such as gas cleaning and scrubbing, humidifying, dehumidifying, air conditioning, liquid cooling and in chemical processes. However, with prior types of apparatus, the more intimate the contact between the liquid and the gas, the greater were the tendencies to "carry over" liquid with the gas and for relatively high pressure drops of the gas passing through the apparatus. The problem of carry over gave rise to the need for "eliminators" for removing such carried over liquid from the gas. These "eliminators" provided absolutely no gas-liquid contact function but merely removed entrained liquid from the gas. Furthermore, in previous types of gas-liquid contact apparatus, separate fans or other air moving means were required for moving the gas through the apparatus. These fans, or gas moving means, did not serve any purpose whatsoever in actually effecting the actual contact between the liquid and the gas. Thus, in most types of previous gas-liquid contact apparatus there were three separate components, namely, a fan for moving the gas, the actual gas-liquid contacting structure, and an eliminator for removing entrained liquid from the gas. The previous apparatus for effecting gas-liquid contact was costly in view of the large number of components contained therein and also was relatively bulky because of this large number of components. Also, prior apparatus caused a relatively high pressure drop of the gas which resulted in high power consumption. Prior devices for separating an entrained liquid from a gas were expensive, bulky, inefficient and created a large pressure drop in the gas passing through the device and therefore required a relatively large motor and a high power input. The present invention is concerned with an improved gas-liquid contact apparatus and an improved mist eliminator for separating an entrained liquid from a gas, both of which types of apparatus overcome the above noted deficiencies of the prior art in a simple and expedient manner.

SUMMARY OF THE INVENTION

It is accordingly one object of the present invention to provide an improved multistage gas-liquid contact apparatus wherein two components perform all three functions of gas moving, gas liquid contacting, and elimination of entrained liquid while also causing only a relatively small pressure drop of gas passing through the apparatus, or producing a pressure gain, if desired. In this respect, a first member in the first stage serves the dual function of a combination gas-liquid contact member and fan, and a second member in the second stage serves the dual function of a combination gas-liquid contact member and eliminator, thereby providing two stages of gas-liquid contact and three separate functions with only two basic components.

Another object of the present invention is to provide an improved gas-liquid contact apparatus which is unusually compact because of the dual function performed by certain of the components thereof.

Still another object of the present invention is to provide an improved multistage gas-liquid contact apparatus wherein certain of the stages may be utilized for effecting contact between a first liquid and a gas and other stages may be used for effecting contact between a second liquid and the gas which was previously contacted by the first liquid with all of the stages being housed within a single apparatus.

Yet another object of the present invention is to provide an improved mist collector for separating an entrained liquid from a gas in a highly efficient manner, that is, with relatively low power requirements and a relatively low pressure drop of the gas passing through the apparatus. A related object is to provide a mist eliminator drum having an eliminator element which can be replaced in a simple and expedient manner.

Another object of the present invention is to provide an improved drum construction which is capable of providing efficient gas-liquid contact and a fan effect. A further object is to provide an improved drum construction which is capable of providing highly efficient elimination and in addition, if desired, gas-liquid contact. Other objects and attendant advantages of the present invention will readily be perceived hereafter.

The improved multistage gas-liquid contact apparatus of the present invention comprises a first stage having a combined gas-liquid contact member and fan therein, and a second stage having an improved gas-liquid contact member and eliminator for removing liquid entrained in the gas in the first stage. Both stages are mounted in a housing so that gas flowing from the first stage must pass through the second stage. The improved gas-liquid contact member in the first stage consists of a drum including a shell and filaments in the form of bristles mounted on the outer portion thereof. Liquid which is deposited in the shell passes through apertures therein to the bristles. The bristles are arranged to provide an air moving effect incidental to the rotation of the drum to thereby cause gas to be pumped outwardly through the apertures in the drum into contact with the liquid on the bristles. The second stage includes a drum with filaments thereon with the bristles being arranged so that the rotation of the drum does not provide so much fan effect so that it negates the fan effect of the first drum. This can be accomplished in any one of a plurality of ways, namely, by causing the filaments of the second drum to be shorter than those of the first drum, or by causing the second drum to rotate at a peripheral speed which is less than that of the first drum, or by arranging the filaments in a configuration on the second drum so that they do not provide as great an air moving effect as the arrangement of the filaments on the first drum. The liquid is fed onto the inside of the second drum so that it passes through apertures in the shell of the drum onto the filaments mounted on the outside of the shell. However, the gas is passed in counterflow relationship relative to the liquid so that it passes along the filaments and then inwardly to the inside of the drum. The centrifugal force of the liquid flowing outwardly on the filaments prevents this liquid from being carried into the inside of the drum, and the filaments pick up any liquid droplets and foreign particles which are entrained with the gas in the first stage. Thus the second drum provides a combined gas-liquid contact function and an elimination function.

The foregoing stages may be arranged so that the liquid passes therethrough in true counterflow relationship or the liquid may be passed to each stage separately. In addition, it is possible with a suitable arrangement of the stages to cause certain stages to be exposed to a first liquid and other stages to be exposed to a different liquid. Furthermore, any number of stages can be combined to provide as many stages as are necessary to effect the desired mixing between a liquid and a gas, or between a plurality of different liquids and a gas.

The improved mist collector of the present invention includes a housing, a gas inlet in the housing, a gas outlet in the housing, means for moving the gas into the housing and an eliminator comprising a rotatable eliminator drum having a replaceable eliminator with spaced filaments thereon for permitting the gas to pass through the spaces between the filaments while the filaments strike the entrained particles of liquid and thus remove them from the gas. Various aspects of the present invention will be more fully understood when the following portions of the specification are read in conjunction with the accompanying drawings wherein:

BRIEF DESCRIPPTPION OF THE DRAWINGS

FIG. 1 is a side elevational view, partially in cross section, showing one embodiment of the improved multistage gas-liquid contact apparatus of the present invention;

FIG. 2 is a fragmentary side elevational view of the combined gas-liquid contact drum and eliminator;

FIG. 3 is a fragmentary view taken substantially along line 3—3 of FIG. 2;

FIG. 4 is a fragmentary side elevational view of the combined gas-liquid contact drum and gas mover;

FIG. 5 is a view taken substantially along line 5—5 of FIG. 4;

FIG. 6 is a view taken substantially along line 6—6 of FIG. 5;

FIG. 7 is a fragmentary perspective view of the drum which provides gas-liquid contact and a pumping effect;

FIG. 8 is a view of an alternate type of construction which can be used for the drum of FIGS. 2 and 3;

FIG. 9 is an elevational view of the fringe member portion of a drum;

FIG. 10 is a view taken substantially along line 10—10 of FIG. 1;

FIG. 11 is an elevational view of a frustoconical type of drum which may be used to provide a combined elimination and gas-liquid contact function;

FIG. 12 is a view taken substantially along line 12—12 of FIG. 11, with certain parts omitted in the interest of clarity;

FIG. 13 is a schematic view of apparatus which is a modification of that shown in FIG. 1;

FIG. 14 is a view of apparatus which may be used to provide many stages of multistage operation;

FIG. 15 is a view partially in longitudinal cross section of a device for separating entrained liquid from a gas;

FIG. 16 is a fragmentary view taken substantially in the direction of the arrows 16—16 of FIG. 15;

FIG. 17 is a cross sectional view taken substantially along line 17—17 of FIG. 15;

FIG. 18 is a perspective view of an anti-splash ring with certain portions broken away to reveal the structure;

DESCRIPTION OF THE PREFERRED EMBODIMENTS

Figure 19:
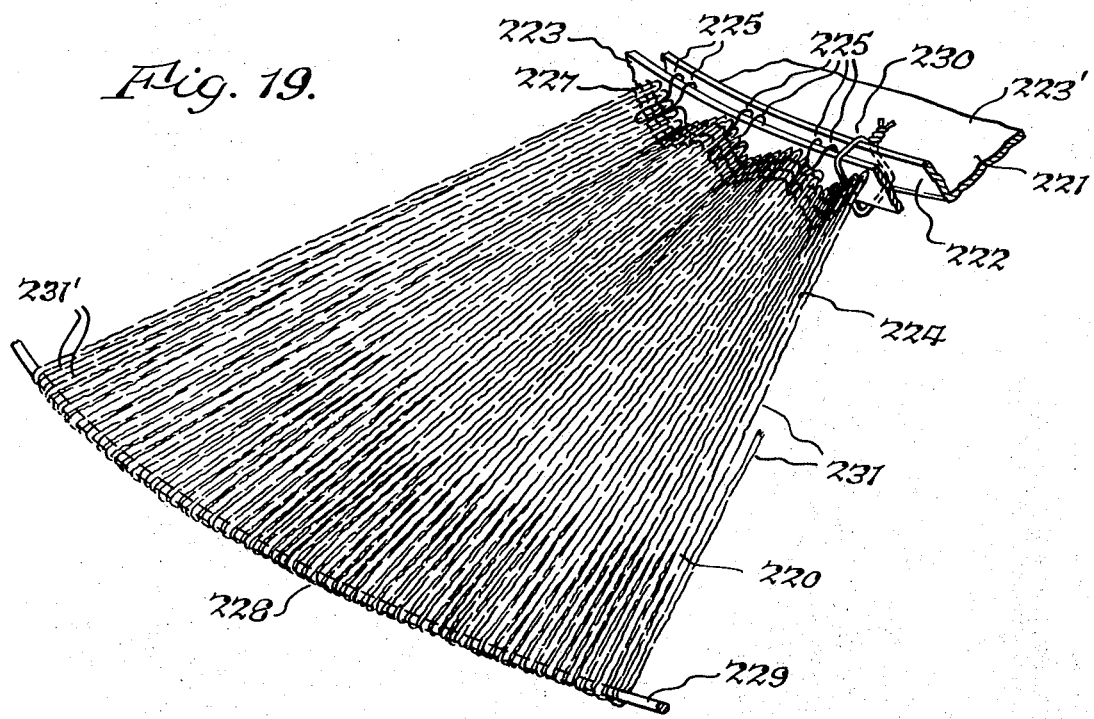
FIG. 19 is a fragmentary enlarged perspective view showing the manner in which the filament fabric is installed on the eliminator drum.

In FIGS. 1–6 one embodiment of the improved multistage gas-liquid contact apparatus 10 is shown which includes a housing 11 in communication with gas inlet conduit 12 and gas outlet conduit 13. Housing 11 includes bottom wall 15, top wall 16 and a side wall 14 which may be cylindrical, square or any other desired cross sectional shape. Bottom wall 15 is suitably attached in fluid tight relationship between the side wall 14 and inlet conduit 12. Top wall 16 is suitably attached in fluid tight relationship between side wall 14 and outlet conduit 13.

A first motor 17 is mounted on wall 14 by bracket 18. A pulley 19 is mounted on motor shaft 20 and is located within conduit extension 21 which is suitably sealed around shaft 20 to prevent leakage of gas. A belt 22 encircles pulley 19 and pulley 23 mounted on shaft 24 having spaced portions journalled in bearings 25 and 26. Bearing 25 is mounted on spider 27 within duct 12 and bearing 26 is mounted on spider 28 within housing 11.

A drum 29, which provides gas-liquid contact, is fixedly secured to shaft 24 for rotation therewith. More specifically, drum 29 includes a plate 30 extending across the end of substantially cylindrical shell or frame 31 having apertures 32 therein. Plate 30 is attached, at its central portion, to sleeve 33 which is attached to shaft 24 by set screw 34. The lower end of drum 29 is mounted proximate extension 12' of conduit 12 so that gas which is delivered through conduit 12 will be directed to the inside of drum 29. Mounted on the outside of shell 31 and forming a part of drum 29 are a plurality of spaced blades or vanes 35 which are formed of filaments 36 in the form of bristles. The exact construction will be described in detail hereafter. However, at the present time it need merely be understood that the rotation of drum 29 will cause a fan effect or gas movement. Stationary annular baffle 15' mounted on the end of conduit 12 prevents significant recirculation of gas. Thus there will be flow of air in the direction as shown schematically by arrows 36', and this flow will require that air be drawn through conduit 12 and extension 12', as depicted by arrows 37. This air will flow through apertures 32 in shell 31. Filaments 36, as well as other filaments described hereafter, may be single, twisted, or woven strands of material.

As noted above, drum 29 is a combined gas-liquid contact member and fan. Liquid is supplied to the inside of drum 29 by conduit 38 having perforations, not numbered, facing shell 31 to direct liquid against said shell, said liquid being obtained from sump 39 mounted on the side 14, with the liquid flow through conduit 38 being effected by pump 40. The liquid which is deposited on the inside of shell 31 will be caused to move through apertures 32 because of the centrifugal force produced during the rotation of drum 29, and this liquid will pass outwardly along the bristles 36. However, as noted above, the gas also passes through apertures 32 and this gas will also be caused to pass outwardly along the bristles 36 in entrainment with the outwardly moving liquid, thereby effecting intimate gas-liquid contact. Because of the closeness of the upper edge of conduit extension 12' to the lower edge of shell 31, and because plate 30 blocks upper end of shell 31, the gas coming from conduit 12 will be directed through apertures 32. The liquid thrown off from filaments or bristles 36 will strike inside of wall 14 and drop into sump 41 which is separated from sump 39 by wall 42. Conduit 43 directs the liquid back to any desired area.

The filaments 36 as described above are oriented in groups of blades or vanes 35. However, it is to be noted that the gas moving effect is due to a combination of actions. Firstly, a part of the gas moving effect is produced by virtue of the fact that gas is induced through openings 32 and passed radially outwardly along the individual filaments 36. The apertures 32 provide inlets at the roots of the filaments in order to establish freedom of entry of the gas, thus providing maximum utilization of the length of the filament to move gas. The portion of gas which is moved according to this type of action permits the filaments to occupy any orientation whatsoever on shell 31; that is, the filaments need not be oriented in the form of vanes 35, as shown. In addition, another part of the air moving effect is produced because of the existence of vanes or blades 35 and therefore irrespective of the existence of apertures, such as 32, there will be an air moving effect due to the existence of blades 35. In drum 29 it is the combined effect of the filaments 36 located adjacent to apertures 32 on one hand, and the shape of blades 35, on the other hand, which provides the air moving effect.

The gas which was treated by drum 29 and which initially generally follows the direction depicted by arrows 36' passes through conduit portion 44' within housing 14, as depicted by arrows 45 and then enters rotating drum 46 which performs a combined gas-liquid contact function and elimination function, wherein suspended free particles of liquid in the gas are removed therefrom and thus only gas passes into conduit 13. To effect rotation of drum 46, a motor 47 is provided which is mounted on housing side 14 by bracket 48. A pulley 49 is mounted on motor shaft 50 within conduit extension 51 in communication with conduit 13. A suitable seal, not shown, may be provided on housing extension 51 surrounding shaft 50 to prevent undesired leakage. A belt 52 encircles pulley 49 and pulley 53 which is mounted on shaft 54 journalled at spaced locations in bearings 55 and 56 which are mounted on spiders 57 and 58, respectively. Spider 57 is located within conduit 13 and spider 58 is located within housing 14. Drum 46 includes a wire shell or frame 59 having a fringe 60 consisting of bristles 61 helically wound on the outer surface thereof. A plate 62 is mounted on sleeve 63 which is secured to shaft 54 by set screw 65. Plate 62, in addition to supporting cylindrical wire framework 59, also acts as a baffle to prevent passage of gas into framework 59, thereby forcing it to move in the direction of arrows 66 through filaments or bristles 61. It will be readily appreciated that any liquid which is entrained in the gas flowing in the direction of arrows 66 will be deposited on bristles 61. The centrifugal force due to rotation of bristles 61 will cause such entrained liquid to be flung outwardly while the pressure of the gas due to the fan effect produced by drum 29 will cause the gas to pass through the wire mesh shell as depicted by arrows 67 and thereafter the gas will pass into outlet conduit 13. To prevent leakage past drum 46 from housing 14 into conduit 13, an annular disc 68 is mounted on shell 59 and, in turn, securely mounts the lower edge of annular resilient baffle 69 having the upper edge engaging the underside of plate 16 with a sliding friction fit. An annular ring 70' further minimizes leakage.

At this point it is to be noted that the fan effect produced by drum 29 must be greater than any fan effect produced by drum 46 in order to produce the pumping action through the apparatus. In the particular case illustrated by FIG. 1, the pumping action which is produced by drum 29 is greater because the overall diameter of the drum including the bristles is larger and they are operated at higher speed and because of the orientation of the bristles. It will be understood that a similar effect can be produced with both drums operated at the same speed from a single motor, by appropriate increase of the diameter of drum 29 or increasing the length of bristles 36, or by orienting the bristles in a suitable manner, or combinations of the foregoing. In any event the operation of the apparatus is dependent on the ability of drum 29 to provide a sufficiently great fan effect to move gas through conduit 12 into housing 14 and then through drum 46 into conduit 13 against the resistance to gas flow provided by drum 46. It will be also appreciated that when additional air pressure or volume is desired because of system requirements, a conventional fan may be employed to supplement the air moving capabilities of the combination fan and gas-liquid contact member 29. If desired, such a fan may be mounted on shaft 24.

As mentioned briefly above, drum 46 is a combined gas-liquid contact member and eliminator for the purpose of preventing carry-over of entrained liquid into conduit 13. If desired, drum 46 can be run without supplemental flooding to thereby serve the sole function of an eliminator. However, it is preferred that it be flooded to thereby provide an additional stage of gas-liquid contact, and to provide the flushing action which is desirable to keep the surface clean and prevent the accumulation of solids due to evaporation of liquid having concentrations of solids. The liquid is supplied to drum 46 by conduit 70 having perforations therein substantially facing wire shell 59. Liquid which enters sump 71 from feed conduit 72 through float valve 73 is supplied to conduit 70 via conduit 74 and pump 75. A shield 76 surrounds a portion of conduit 70 to prevent undesired splashback of liquid into the gas stream depicted by arrows 67. In other words, the liquid is directed against shell 59 and once it is deposited thereon the centrifugal force of rotation causes such liquid to pass radially outwardly. However, any splashing which is experienced as a result of the depositing of the liquid is prevented from entering the gas stream depicted by arrows 67 because of the presence of splash shield 76, see FIG. 10. The liquid passing radially outwardly on bristles 61 is brought into intimate contact with the gas flowing radially inwardly relative to the bristles in the direction of arrows 66, and because of the relatively large surface area provided by the bristles and because of the speed of rotation of drum 46, intimate gas-liquid contact is realized. The action which permits the counterflow relationship between the liquid and gas through drum 46 was described in specific detail in copending application Ser. No. 411,232. It is to be especially noted that there is no entrainment of liquid in the gas leaving drum 46 in the direction of arrows 67, and, further, the pressure drop through the drum is extremely low because of its highly perforate nature.

It can thus be seen that the two drums 29 and 46 perform three functions, namely, that of moving the gas, that of effecting gas-liquid contact, and that of eliminating any entrained liquid from the gas. Furthermore, the apparatus can be operated so that drum 29 provides either a combined fan action and gas-liquid contact action or merely a fan action, if the liquid is shut off. In addition, drum 46 can perform a combined gas-liquid contact function and eliminating function, or, if desired, the liquid flow may be shut off so that drum 46 runs unflooded to provide only an eliminating function.

The liquid circuit through the apparatus 10 is shown in FIG. 1 as being in broadly counterflow relationship relative to the flow of the gas. More specifically, liquid enters the apparatus through conduit 72 and it passes from conduit 70 in counterflow relationship relative to the gas passing inwardly through drum 46. The liquid which is thrown from bristles 61 falls into annular sump 44 which is mounted on the inner surface of wall 14. Sump 44 is separated from sump 71 by wall 77. The liquid from sump 44 passes into conduit 78 which conducts it to sump 39 and thereafter this liquid is caused to flow through drum 29 in parallel relation with the gas, that is in the same direction as the gas flows through this drum. The liquid thereafter falls into sump 41 and passes therefrom through conduit 43.

It will be appreciated that the foregoing liquid circuit need not be followed but that liquid may be supplied separately to sumps 71 and 39. In this case normally open valve 79 may be closed and normally closed valve 80 may be open to permit liquid to enter conduit 78 from conduit 81. In this case a float valve 82 is provided to control the liquid level in sump 39. When the foregoing circuit is utilized normally closed valve 83 is open to permit liquid from sump 44 to leave through conduits 78 and 84. With an arrangement as just described, each stage may utilize separate liquids, as might be required in a chemical process. In other words, drum 29 can provide a gas-liquid contact with a first liquid and drum 46 can supply gas-liquid contact with another liquid. As will become more apparent hereafter, if more than one liquid is used, it is preferable that two stages be used with each liquid and two additional stages be used with another liquid because the elimination stage of the first two stages prevents carryover of the first liquid into the second liquid. It will also be understood that the liquid removed from either stage may be heated or cooled as required, and recirculated, or the liquid may be discarded and replaced with fresh, depending on the circumstances, and according to practices well established in heat transfer work.

In FIGS. 4, 5 and 6 the specific construction of drum 29 is shown. This drum includes a perforate shell or frame preferably made of sheet metal or other rigid material having axial ribs 85 connected by transverse ribs 86. It is the space between adjacent ribs 86 and adjacent ribs 85 which forms apertures 32 noted above. Plate 30 which is mounted at the upper end of cylindrical shell 31 enhances the stability thereof in addition to blocking flow of gas to act as a baffle to force the air through the apertures 32.

Other forms of construction may be used as a means of supporting the bristle or fringe members, including wire mesh or perforated metal or plastic of various forms. The essential requirements are to provide openings to permit the gas to flow directly into the base of the bristles, and the necessary structural strength to withstand the rotational stresses.

The fan blade 35 consists of an elongated fringe member 90 having bristles 36, said fringe member being mounted on the outer periphery of shell 31 in a serpentine manner by the use of spaced brackets 87. Brackets 87 include bands 88 which encircle shell 31 and are securely attached thereto. Spaced wall portions 89 of brackets 87 are bent upwardly from bands 88. As can be seen from FIG. 5, wall portions 89 of lower band 87 are staggered relative to wall portions 89 of upper band 87. It is these wall portions 89 which provide the framework for the serpentine winding of fringe member 90 which is used to form blades 35. As can be seen from FIG. 5, the serpentine fringe member is depicted by numeral 90 in dot-dash lines. In other words, the fringe member is placed around the outside of a lower wall 89 and then is moved upwardly parallel to ribs 85 and then located behind upper wall 89 and this process is repeated. The ends of fan blades 35 are secured to opposite brackets 87 by aligned tabs 91. More specifically, after the fringe member 90 has been positioned in the serpentine manner described above, the portions 92 of tab members 91 are bent over an adjacent portion of the fringe 90 so as to provide a fan blade 35 between opposite brackets 87 at spaced locations therefrom. The portions 35' which extend between adjacent blades 35 may be cut off, or permitted to remain inasmuch as it will give a certain amount of fan effect and in addition will provide surface for gas-liquid contact. The portion of the fringe member which is deformed by tabs 92 can be cut away. The fringe member which is used in forming blades 35 is the same as described in my above noted patent application Ser. No. 411,232 and it includes the outwardly extending bristles 36 which are secured to each other at their bases by weaving 93, as broadly shown in FIG. 9.

In FIGS. 2 and 3, the specific details of the construction of combined liquid-gas contact and eliminator drum 46 are shown. This drum includes a shell 59 which is fabricated from wire. More specifically, a plurality of axially extending wire ribs 94 are provided with their opposite ends being suitably secured, as by welding, to plates 62 and 68. Serpentine wires 95 have their base portions secured, as by welding, to wires 94, as shown in FIGS. 2 and 3. Ring wires 96 are associated with wires 94 and 95 in the manner shown in FIGS. 2 and 3 to lend stability to the shell or frame 59. The opposite ends of serpentine wires 95 are secured, as by welding, to plates 62 and 68 and wires 96 are also secured, as by welding, to wires 95 and 94 at their areas of intersection. A fringe member such as shown in FIG. 9 is wound helically on the above described framework by anchoring one end proximate plate 62 and thereafter stringing the base of the fringe member into the spaced U-shaped receptacles 97 provided by serpentine wire 95. After the fringe member is entirely wound in the foregoing fashion, the opposite end thereof is attached to plate 68. As noted above, when water is deposited on the inside of the frame or shell 59, the centrifugal force due to rotation will cause it to move outwardly through the frame onto the bristles 61 while the spaces 98 between the various wires 94, 95 and 96 permit relatively unobstructed flow of air inwardly into shell 59.

In FIG. 8 an alternate construction of a shell suitable for use in a drum such as 46 is shown. This shell consists of spaced circular wires 100 mounting parallel wires 101 which extend perpendicularly thereto and are parallel to the axis of the cylinder formed by the joined wires 100 and 101. Spaced U-shaped members 102 are mounted on each of wires 101 and these U-shaped members receive the base of a fringe member such as 90.

In FIGS. 11 and 12 an alternate construction of a drum is shown which can be used as a combined gas-liquid contact member and eliminator. Drum 105 is an inverted frusto-conical unit and is adapted to be mounted on shaft 54 in lieu of drum 46. Drum 105 includes an upper rim 106 connected to lower rim 107 by spaced spokes or wires 108 extending therebetween. Wound about rings 106' and 107' attached to rims 106 and 107, respectively, are filaments 109, which may be part of a single continuous filament and which may be of any desired material, such as nylon, rayon, polypropylene, cotton, stainless steel or other metals, ceramics, or glass fibers. An annular circular plate 110 is secured to bottom rim 107 by spaced bolts 110' and the outer edge 117' thereof overlies filaments 109. Liquid is deposited, by conduit 109' into space 112 between plate 110 and plate 111' secured to annular rim 107 by bolts 110'. When drum 105 is rotating, this liquid passes radially outwardly between plate 110 and underlying plate 111' until it reaches filaments 109. Thereafter the liquid climbs upwardly on filaments 109 from the lower base toward the higher base of the frusto-conical member 105 because of centrifugal force. The spacing between filaments 109 is such that it permits gas to pass therethrough from the outside toward the inside of the frusto-conical member without an undesirable pressure drop, but the rotating filaments 109 will trap any entrained liquid and therefore prevent it from passing through frustoconical member 105. In this manner an elimination function is achieved. In addition, the liquid which wets filaments 109 contacts the gas passing therethrough to provide the desired gas-liquid contact. The liquid which passes upwardly along filaments 109 will be flung outwardly, and some liquid may ascend as high as the rim portion 113 on the inside of rim 106. As can be seen, a plurality of apertures 114 are provided below rim portion 113 to permit any liquid which is accumulated below rim 113 to be flung radially outwardly against the wall of housing 14. In addition, a rotating baffle 115 is provided on rim 106 and which runs in close proximity to a stationary baffle ring 115' on the underside of a plate such as 16 of FIG. 1 to prevent passage of liquid. Rim portion 116' in conjunction with baffle 115' provides a similar function. In this embodiment, rims 106 and 107 and wires 108 essentially provide a shell, and filaments 109 are the gas-liquid contact members. A collar 108' is rigidly secured to plate 111' for mounting drum 105 on shaft 54. If desired, conduit 109' may be located to discharge upwardly on the lower surface of plate 111' and suitable apertures may be provided in rim 107 to release the liquid onto adjacent portions of filaments 109. In this modification an excess of liquid may be supplied and splashback may be tolerated because the liquid is deposited in a wet area, that is, where droplets already exist because of the action of the combined gas moving and interchanging drum 29. It will also be appreciated that, if desired, the drum 105 may be substantially cylindrical with the filaments extending generally longitudinally between the spaced rings.

In the embodiment shown in FIGS. 11 and 12, multifilament nylon of approximately 1,000 denier was used and was very closely spaced proximate ring 107' and the filaments diverged so that they were spaced a greater amount from each other at ring 106'. Thus, there is a greater free area or a greater spacing between the filaments at ring 106'. If desired, the filaments can overlap each other proximate small ring 107' and still can have a suitable spacing proximate ring 106'. The exact spacing between filaments will vary in accordance with the requirements of any particular application. In addition, monofilaments may be used instead of multistrand filaments and various materials may be used.

The foregoing description has been directed to gas-liquid contact generally, and it will therefore be appreciated that the present apparatus is capable of use with any liquids and with any gases. The most common use for the apparatus is in contacting air and water for air conditioning, humidifying and dehumidifying purposes. However, the apparatus is also manifestly suitable for use in chemical processes wherein gases other than air have to be treated with liquids other than water. Furthermore, as noted above, in the chemical processes a plurality of different liquids may be used to sequentially treat a gas in a continuous process.

As noted above, the filaments or bristles may be fabricated from any suitable type of material. For chemical applications where the corrosive nature of the gases and liquids are to be considered, stainless steel wires or other relatively inert metals may be used in fabricating the shells and the filaments or bristles of the drums. For other processes plastic materials such as nylon, polypropylene, ceramics or rayon may be used. In addition the filaments may be made of cotton or any other desired material. The specific material which is used will depend on the requirements of any particular process. While the filaments in FIGS. 1–6 have been shown as having cut ends, it will be appreciated that they can be formed as loops.

In FIG. 13 a modified form of the present invention is shown for use preferably in air purification. This embodiment includes a housing 120 having louvers 121 at the lower portion thereof through which air enters, this flow being induced by the action of combined fan and gas-liquid contact member 122 which is analogous to drum 29 of FIG. 1. The specific details of construction will not be repeated except to indicate that the construction of the drum may be identical to that of drum 29. The contaminated air entering through louvers 121 is drawn through a drum 123 which may be identical in construction to drum 46 of FIG. 1. Water is supplied to header 124 through stationary conduits 125 and 126, and this water is projected onto the inside of drum 123 and it passes outwardly along the bristles 127 thereon. The air, in turn, passes through the bristles 127 in counterflow relationship to the air. The water drops into sump 128 and then passes into the exhaust conduit 129. The purpose of this particular stage is to collect solids in sump 128 and thereafter solid-laden water may be passed to a sewer for disposal. In other words, the gas-liquid counterflow contact in drum 123 is for the purpose of removing heavy solids. After passing through drum 123 the air flows in the direction of arrows 130 through conduit 131 to which the above-described drum 123 is attached. An annular baffle 132 is mounted on the inside of housing 120 to prevent the air from flowing around drum 123 and therefore causes it to pass through the drum 123 in the manner described above. The sides 133 of baffle 132 are in close proximity to conduit 131 to provide desired sealing, and parts 132 and 133 serve the additional function of a sump.

Drum 122 acts as a combined liquid contact member and air moving member to cause the air to move in the direction of arrows 134 through the drum. Thereafter the air assumes the direction of arrows 135. The upper portion 136 of conduit 126 is in communication with conduit 137 which in turn is in communication with a source of suitable liquid, not shown, which may be potassium permanganate or other deodorizing, neutralizing, or absorbing solution. At this point, it is to be noted that the lower portion 138 of conduit 126 is blocked from upper portion 136 by obstruction 139 therein so that the chemical solution will remain separate from the water in portion 138. Nozzle or header 140 sprays the deodorizing solution on the inside of drum 122 which as noted above induces the air flow therethrough in the same direction as the flow of liquid.

As noted above, drum 122 may be analogous in all respects to drum 29 of FIG. 1 and therefore a detailed description of its mode of operation is deemed unnecessary. The mixture of liquid and gas flowing in the direction of arrows 135 is forced into housing chamber 141 and thereafter forced through drum 142 which may be identical in all respects to drum 46 of FIG. 1 or drum 105 of FIG. 12, and may function in the same manner. The deodorizing fluid is projected from header 143 onto the inside of drum 142 because header 143 is in communication with conduit 136 through conduit 144. A baffle, such as 76 of FIG. 1, may be provided around header 143 to prevent splashback. A baffle plate 145 separates drums 122 and 142 to prevent the air from flowing directly from the inside of one into the inside of the other.

As can be seen from the drawing, the unit consisting of drums 127, 122 and 142 and conduit 131 is driven from motor 146 through belt 147 encircling pulleys 148 and 149, the latter being mounted on plate 123' which is journalled on conduit 138 by bearing 150. Bearings 151, 152 and 153 also journal other portions of the drum assembly 127, 122, 142 to conduit 126 for rotation thereon. Suitable spiders couple bearings 151, 152 and 153 to the drums. The cleansed air leaves housing 120 through conduit 154. The same solution is used in drums 142 and 122. However, the circuitry may comprise any association of conduits shown in FIG. 1 whereby drum 142 may be fed with a separate liquid from drum 122. It can thus be seen that FIG. 13 shows a unit which may provide a function in addition to those shown in FIG. 1, namely, the additional function of separating solids from the air prior to treating the air.

It will be appreciated that drum 122 may be proportioned and driven at a suitable speed so that it will generate sufficient pressure to overcome the resistance of drums 127 and 142 and thus deliver a volume of gas through conduit 154. However, the air moving capabilities of drum 122 may be supplemented by a conventional fan connected to conduit 154 when it is desired to provide additional external pressure or gas volume. Also, the function of drum 142 may be performed by a frustoconical drum similar to drum 105 shown in FIG. 12. In addition, the drums may be operated at different speeds by suitable arrangements of drives.

In FIG. 14 a still further embodiment of the present invention is shown and this embodiment is directed to a multistage absorption column. In this embodiment a housing 160 is provided having a gas inlet conduit 161 in communication with one end thereof and a gas outlet conduit 162 in communication with the other end thereof. A rotatable shaft 163 is concentrically placed within housing 160 and is driven from motor 164 by pulleys 165 and 166 and belt 167. Shaft 163 is journalled in bearings 168 and 169'. At spaced locations on shaft 163 are a plurality of multistage gas-liquid interchangers of the type shown in FIG. 1.

Housing 160 contains a plurality of stages 169, 170, 171 and 172. Stage 169 consists of drums 173 and 174 which are analogous to drums 29 and 46, respectiviely, of FIG. 1. These drums are separated by plates 175 to cause the gas to follow the direction of arrows 176, 177 and 178. Plate 175 also serves to mount drums 173 and 174 on shaft 163 by means of coupling 179. Liquid is supplied to drum 173 through conduit 180 in communication with sump 181 of the preceding stage 170 and delivers liquid to perforated header 182. Liquid is also supplied to drum 174 through perforated header 183 in communication with sump 181 through conduit 184. The liquid drops into sump 185 and leaves the apparatus through conduit 186. Stages 170, 171 and 172 are identical to stage 169 and therefore a detailed explanation is not deemed necessary. It is to be noted, however, that the liquid for stage 170 is obtained from sump 187 immediately above it and this liquid is supplied to conduits and headers which are analogous to conduits 180 and 184 and headers 182 and 183, respectively. The original liquid which is supplied to stage 172 comes through conduit 189 and is delivered to headers 190 and 191 through conduits 192 and 193, respectively. The bottom and side walls of annular sumps 181, 187 and 188 also serve as baffles to direct the gas in a sinuous path in the direction of the arrows. Baffles are provided in each stage which are identical to baffle 175.

While the multistage absorption column shown in FIG. 14 utilizes the same liquid flowing through the entire apparatus, it will be appreciated that a plurality of different liquids may be used. In this respect, with suitable piping a first liquid may be suplied to stage 172 and sump 188 may drain back to the source of that liquid. Another conduit carrying a different liquid may be supplied to stage 171 in the same manner as the liquid is supplied to stage 172. A third liquid may be supplied to stage 170 and a fourth liquid may be supplied to stage 169. It can readily be seen therefore that the apparatus of FIG. 14 is manifestly capable of providing a gas-liquid contact between a gas and a plurality of different liquids, or the same liquid at different temperatures and concentrations, while maintaining the liquids separate from each other and preventing carry-over of liquids from one stage to the other.

It will be appreciated that a suitably channeled hollow shaft such as shown in FIG. 13 may be used in the embodiment of FIG. 14.

The drums described above relative to all embodiments of the invention provide a self-flushing action, that is, the liquid which contacts the gas also flushes the filaments on the drums to minimize the deposits of solids.

In the previous embodiments of the invention as shown and described relative to FIGS. 1 through 12, there was described a construction for moving a gas containing entrained liquid through a housing and the use of an eliminator drum for removing the entrained liquid from the gas. This was effected by running the drum 46 of FIG. 1 or the drum 105 of FIGS. 11 and 12 without supplemental flooding and forcing the gas containing liquid therethrough.

In FIGS. 15 through 25 further modifications of the subject matter of FIGS. 1 through 12 are presented for the purpose of removing entrained liquid from a gas in a highly simple and expedient manner. These embodiments of the invention are capable of use with any gas to remove any liquid therefrom and certain typical applications, without limitation, are the removal of oil mists or other pollutants, either solid or liquid, from air surrounding industrial machines, the removal of liquid droplets entrained in air as a result of air-liquid contact operations, the removal of lquid chemicals dispersed in gases as a result of gas-liquid contact experienced in chemical operations, the collecting of water from air for reuse, the elimination of fog from air for clearing airports and highway intersections, and the collection of paint spray from paint booth exhausts.

In the embodiment of FIGS. 15 through 20 a mist collector is shown for removing liquid which is entrained in a gas. The mist collector includes a housing 200 of generally cylindrical configuration. A spider 201 has legs 202 extending radially outwardly from cylindrical motor carrying portions 203 having opposite ends which are drawn together by faster 204 to securely mount doubleended motor 205. The opposite ends of legs 202 are secured to housing 200 by rivets 206. A fan 207 is mounted on the end 208 of the shaft extending from one end of motor 205 and an eliminator drum 209 is mounted on the end 210 of the shaft extending from the other end of motor 205.

Broadly, when motor 205 is in operation fan 207 will induce air to flow into inlet conduit 211, through eliminator drum 209, through housing 200, through fan 207 and out through outlet grill 212. Any entrained liquid in the gas will be trapped and removed therefrom by eliminator drum 209 and the gas being discharged will be free of such liquid. If desired the air flow can be reversed by causing the fan to effect the air flow in the opposite direction.

The eliminator drum 209 includes a frame having an hub portion 213, which may be a suitable disc-shaped member which is attached to shaft portion 210 by a set screw or the like 214 extending through hub portion 215. A plurality of spoke-like members 216 form a substantially frusto-conical frame by having first ends suitably secured to the outer edge of hub 213 and the outer ends 217 secured, as by welding, at spaced locations on parallel circular rings 218 and 219. The spaces between members 216 constitute apertures through which gas may pass.

A removable and replaceable eliminator element 220 is mounted on the frame of eliminator drum 209. More specifically, element 220 includes a central disc 221 having a rim 222 (FIG. 19) of generally frusto-conical configuration and a solid central portion 223' containing only an aperture (not shown) of a size which will fit over shaft end 210. A frusto-conical ring 223 mounts the superimposed edges of fabric 224 by being threaded through loops 225 (FIGS. 19 and 20) produced by a continuous thread 226 formed into a suitable shape and sewn into the selvage 227 on opposite edges of the fabric 224. As can readily be visualized from FIGS. 15, 16, 19 and 20, the fabric 224 is doubled over on itself along line of stitching 228 at its central portion and this line of stitching lies in contiguous relationship to ring 229 (FIGS. 15 and 19). This will form a double thickness because of the lapped relationship of the threads on opposite sides of stitching 228. Loops 225 at one side of the fabric will overlie corresponding loops on the opposite side when the fabric is folded in half, because it is symmetrical about its centerline along the row of stitching 28. Thereafter, as can be seen from FIG. 19, pairs of loops 225 are threaded by ring 223 with the superimposed inner edges at 227 being accordion-pleated to compensate for the fact that the peripheral length of ring 223 is much shorter than the peripheral length of ring 229. At this point it is to be noted that ring 223 is not continuous, that is, it must be slit somewhere along its length to permit loops 225 to be threaded thereon. After such threading has been completed, ring 223 is secured to flange 222 at spaced locations by wire ties 230.

The fabric 224 consists of threads 231 which are joined only at the selvage edges 227 and along seam 228. They are not joined at the central portions between said seam 228 and the edges and it is these central portions which extend between rings 223 and 229 as shown in FIG. 19. Thus, there are spaces 231' between adjacent threads through which the gas can pass while the eliminator wheel 209 is rotating. The threads are preferably multifilament nylon but can be fabricated from any type of material as described above relative to the other embodiments of the invention. It is preferable however that multifilament material be used as this has exhibited an affinity to collect and retain liquid.

Figure 20:
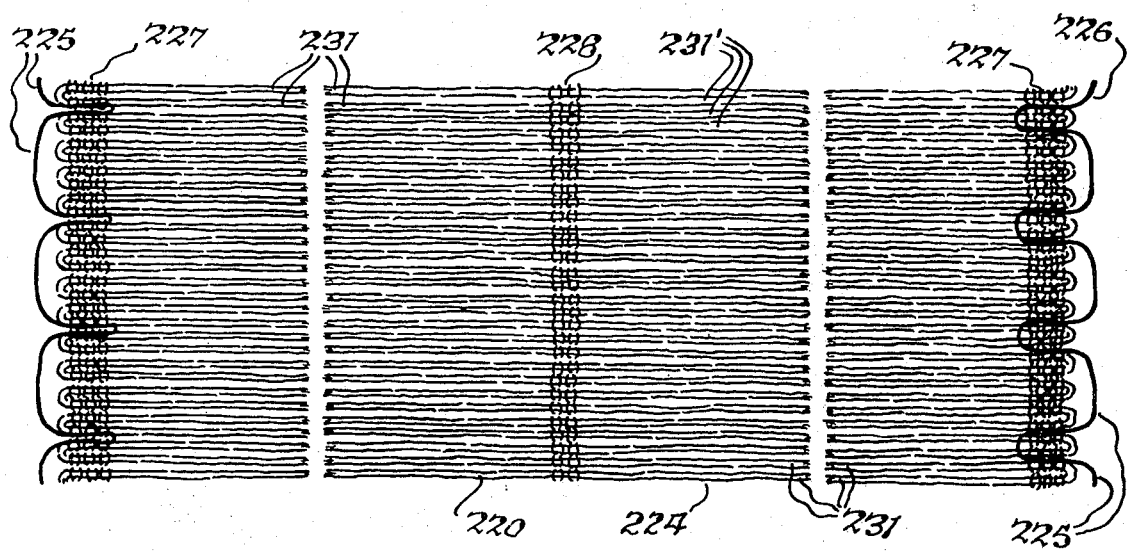
FIG. 20 is a perspective view showing the structure of the filament fabric before mounting on the eliminator drum.

The dimensions of element 220 as used in a test model were as follows but different dimensions can be used for both the size of the threads 231 and the spacing therebetween. The diameter of ring 229 is approximately 12 inches; the diameter of disc 221 is approximately 3 inches; and the height of the frusto-conical configuration defined by ring 229 and base 221 is 2½ inches. The fabric 220, as shown in FIG. 20, is 10½ inches wide between the outer edges of the selvage. Each thread 231 is .025 inch or 2775 denier in diameter and there are eleven threads per inch. Therefore each inch of fabric contains .275 inch of threads with the remainder of the inch being divided into equal spaces between the adjacent threads. The threads 231 are multifilament, that is, they are made up of smaller filaments or fibers which are suitably held together. A commercial thread or yarn which is suitable is known by the trademark "Cordura" of the Du Pont Company and can be further identified by the identification number 2775–420–N56. This thread is composed of nylon filaments.

To secure the element 220 to the frame of the eliminator wheel 209, it is merely necessary to mount ring 229 on the frame by locating it in contiguous parallel relationship to ring 219 as shown in FIG. 15. Thereafter, central portion 223' is mounted on shaft end 210 and a washer or sleeve 233 is placed over shaft end 210 and pushed upwardly in FIG. 15 to cause the threads 231 of element 220 to be pulled reasonably taut. Thereafter set screw 234 is tightened to retain element 220 in position. It can readily be seen therefore that replacement elements 220 may be easily installed whenever the one on the equipment becomes unusable as a result of being either worn or destroyed.

Figure 22:
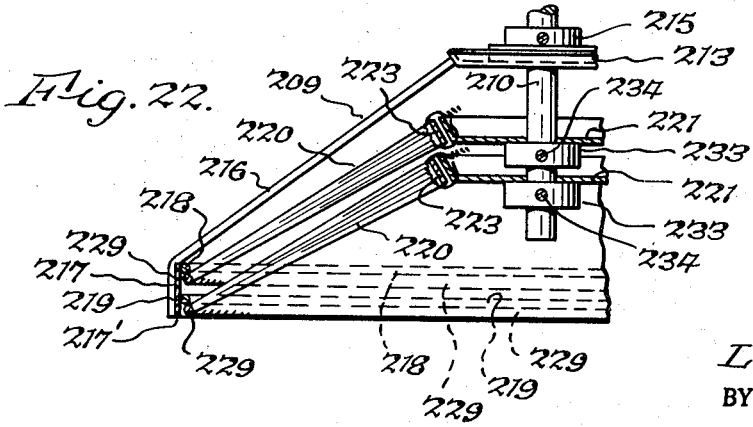
FIG. 22 is a fragmentary cross sectional view similar to portions of FIGS. 15 and 21, but showing the manner in which a plurality of rows of filaments may be mounted on the eliminator drum for certain applications.

At this point it is to be noted that for certain applications it might be necessary to use a tandem arrangement of elements 220 and this is shown in FIG. 22. In this respect it is to be noted that the upper element 220 is snapped into position under ring 218 and disc 221 of the upper element 220 is held on shaft end 210 by upper washer 233. The lower element 220 is located in an identical position to that described above relative to FIG. 15. An annular ring 217' is interposed between rings 218 and 219, on one hand, and spoke ends 217 on the other hand, to act as a baffle to prevent the gas which passed through the lower element 220 from bypassing upper element 220. A similar ring 217' may be used in FIG. 15, to thereby permit ring 229 to be installed against ring 218 rather than against ring 219, as shown.

To prevent the liquid laden gas from bypassing eliminator drum 209, duct 232 terminates proximate element 220. Thus during rotation of fan 207 and eliminator wheel 209, the air which is induced into inlet duct 211 will be forced through rotating element 220 as this is the only path it can follow. In this respect it is to be noted that a dished circular disc 234' (FIG. 15) is interposed between collar 233 and disc portion 223', which the outer edge of disc 234' overlying loops 225 to prevent the air from passing through the spaces proximate these loops at ring 223.

During rotation of drum 209 gas will pass through the spaces between the rapidly rotating threads 231 which will intercept and catch the liquid entrained therein and cause it to travel toward the larger base of the frusto-conical element by centrifugal force. The fact that the threads 231 are multi-filament causes them to be porous and this will increase their ability to hold the liquid because it travels through the spaces between the filaments of the threads as well as along the surfaces thereof and thus then tendency for the gas flowing through the element 220 to pick off the liquid from the threads 231 is greatly minimized. It is believed that the liquid is held on and in the threads by a combination of surface tension and capillary action. The air which has had the liquid removed will pass upwardly through the spaces or apertures between members 216, through housing 200, fan 207 and through grill 212, which is essentially an outlet duct. The fact that the threads 231 are spaced will permit the air to flow through element 220 with a relatively low pressure drop and thus the device will require relatively low power. Annular flange 236 surrounds fan 207 to fit the fan to the casing or if the fan is large enough this flange may be omitted.

The frusto-conical rotating eliminator element 220, when used as shown in FIG. 15, provides a fan effect to supplement the action of fan 207. This fan effect is due to the existence of the threads 231, as well as the fact that the fabric 224 is accordion-pleated to provide a vane-like structure. In fact, if desired, the fan 207 may be eliminated. Tests have shown that with the above-described eliminator element 220 powered by a 1/10 horsepower motor and without a fan, the apparatus could move 300 cubic feet per minute at 1000 r.p.m. and 400 cubic feet per minute at 1650 r.p.m. With a fan and collector element mounted on a single 1/8 horsepower motor the device as illustrated in FIG. 15 moves 450 cubic feet per minute at 1000 r.p.m. and 600 cubic feet per minute at 1650 r.p.m. Various combinations of drums 209 may be used in addition to those described above. For example, the device of FIG. 15 could be modified by placing another eliminator drum 209 on the opposite side of fan 207 from the eliminator drum 209 shown in the drawing, and by driving this added drum by the same motor or by an additional motor. The two drums 209 could be oriented in the same direction or in opposite directions. Also if desired, drum 209, when used alone, could be turned 180° so that the air flow therethrough would be in the direction shown in FIGS. 11 and 12. In other words any desired number of drums such as 209 may be used with or without a fan or fans and the air flow may be in any desired direction through the drums. While the element 220 has been shown in frusto-conical form, it will be appreciated that it can be formed into a cylinder where threads 231 will be parallel to the axis of rotation, or it may be formed into a disc shape where threads 231 will be perpendicular to the axis of rotation.

The liquid which is picked up by the threads 231, as noted above, travels toward ring 229 and is thrown off radially. To avoid splashback of liquid into the air stream, an antisplash ring 237 (FIGS. 15 and 18) is mounted within housing 200 in contiguous relationship to eliminator drum portions 217. Antisplash ring 237 consists of a pair of spaced rings 238 secured to each other at spaced intervals by transverse brackets 239. A porous foam sheeting 240 covers the inner surface of the cylinder formed by rings 238 and this foam sheeting is secured to the rings by staples 241 at spaced locations. Any other porous material such as gauze-like netting or the like or perforated metal or screening may be used. The antisplash ring 237 is held in position within housing 200 by a friction-fit. As the liquid droplets leave eliminator drum 209, they will impinge on porous material 240 which will tend to absorb it. When this porous material becomes saturated, the liquid will drip therefrom into trough 242 formed at the bottom of the housing and it will drain therefrom through drain outlet 243 to a suitable container (not shown). This drainage is effected in this manner when the housing 200 is mounted for vertical operation as shown in FIG. 15. However, the housing 200 can be turned 90° to assume an horizontal attitude in which event drainage is effected through outlet duct 244. The duct 243 or 244 which is not being used can be capped. When duct 244 is being used, spaced rings 238 will define a drainage channel through which the liquid leaving foam 240 is conducted to drain conduit 244.

An annular flange 245 is mounted within housing 200 between spider 202 and antisplash ring 237. As can be seen ring 245 has a portion 246 which forms a channel 247 in combination with the inside wall of housing 200. Thus, any liquid which tends to move along the inside wall of housing 200 as a result of the air flow toward fan 207 will be trapped by channel 247 and will not be discharged with the airstream.

Figure 21:
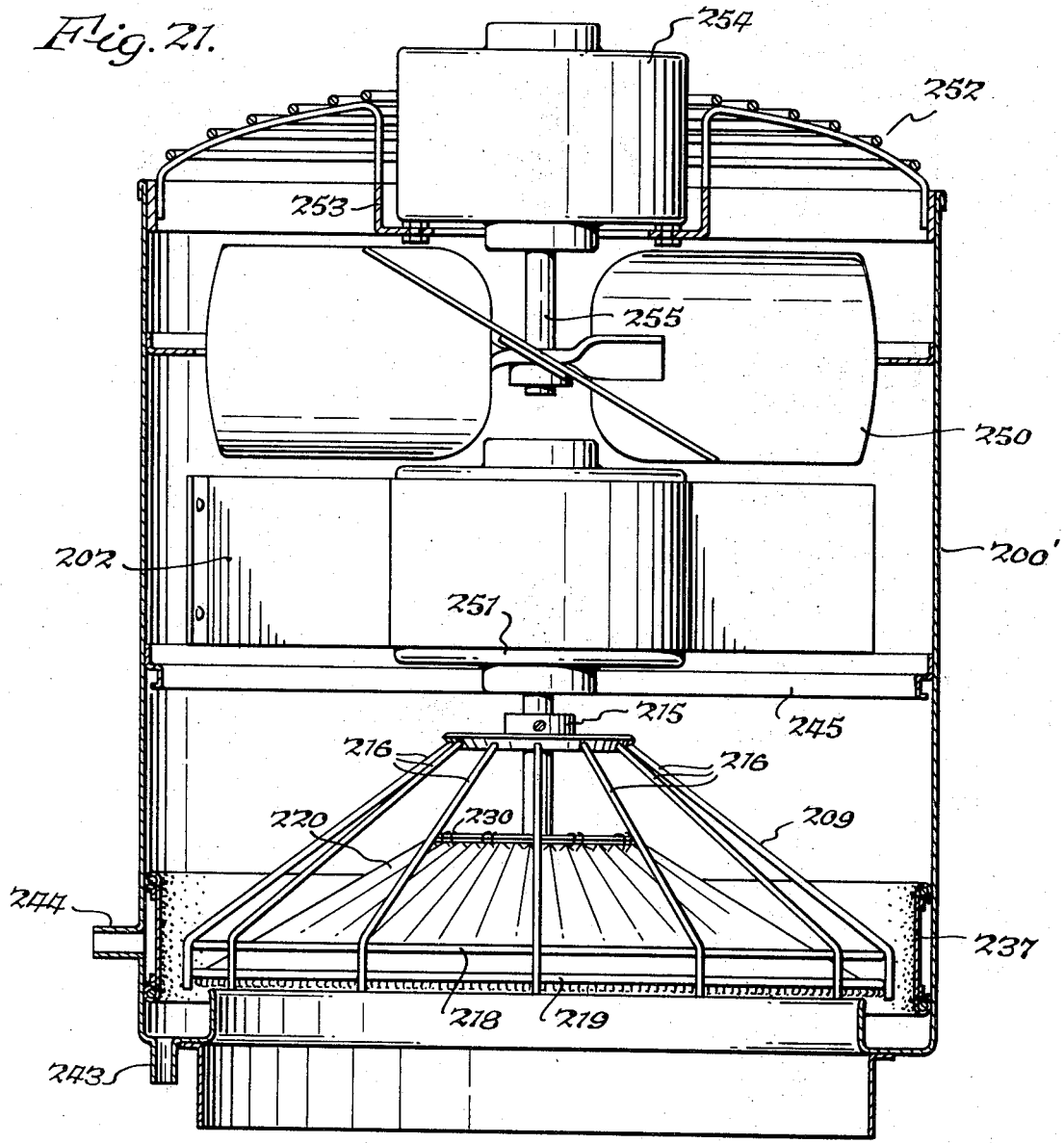
FIG. 21 is a longitudinal cross sectional view through a modified embodiment of the device of FIG. 15.

In FIG. 21 another embodiment of the present invention is disclosed. This embodiment differs only in one respect from the embodiment of FIGS. 15 through 20, namely, that separate motors are used for driving the fan 250 and the eliminator drum 209. In this respect it is to be noted that the eliminator drum 209, the antisplash ring 237 and all other portions of the mist collector below spider 202 are identical in all respects to that described above relative to FIGS. 15 through 20 and therefore a description of this structure will not be repeated. Motor 251 is a single-ended motor and drives eliminator drum 209. The top of housing 200' is modified by mounting a grill 252 having a central depression 253 which mounts fan motor 254 which in turn mounts fan 250 on shaft 255. In this embodiment of the invention the fan can be driven at a different speed than eliminator wheel 209 and this is desirable under certain circumstances where it may be necessary to employ high fan speeds to develop extra pressure to overcome external resistance on a given installation.

Figure 23:
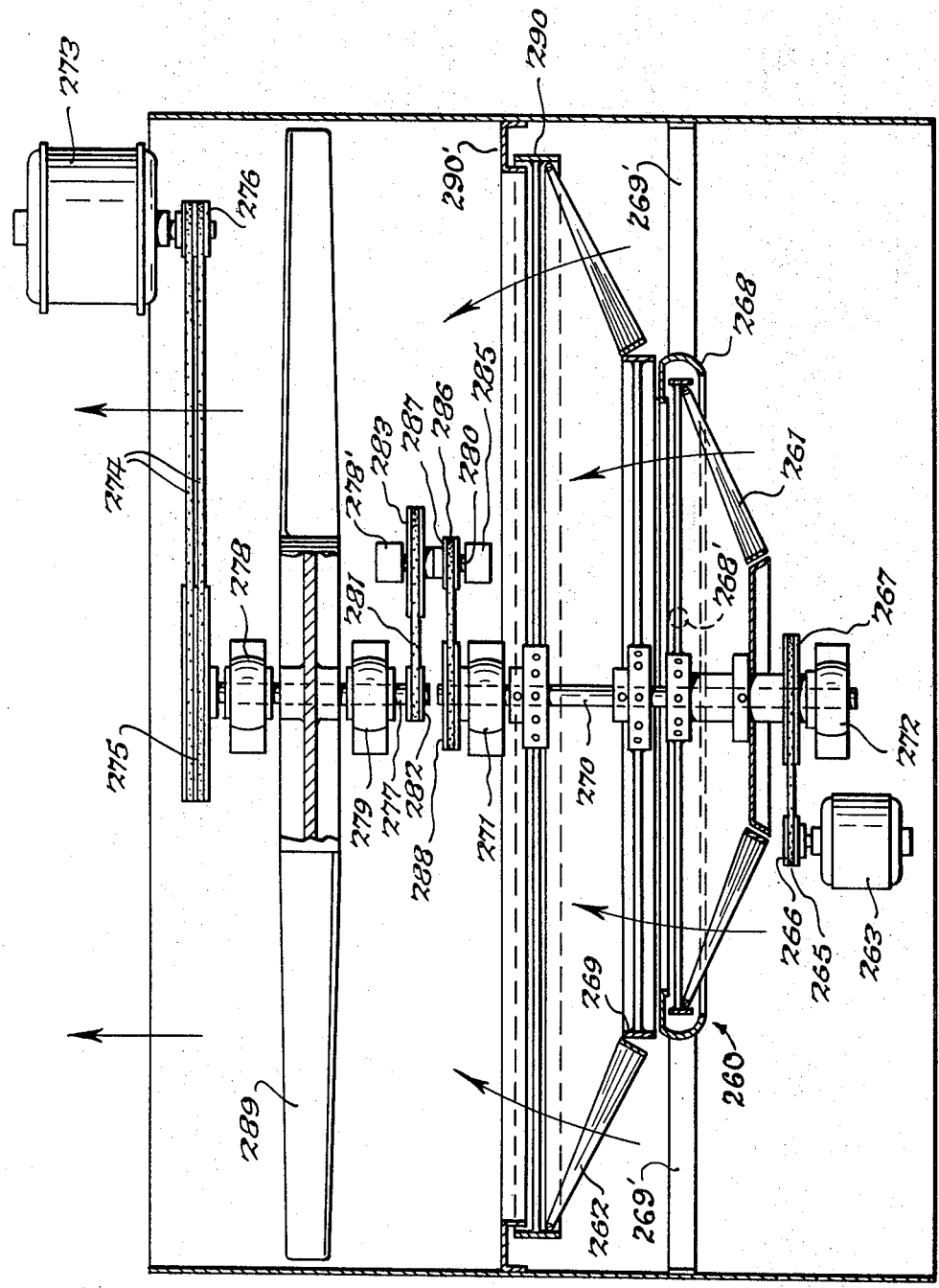
FIG. 23 is a longitudinal cross sectional view of another embodiment of the mist eliminator which may be fabricated in extremely large sizes because the eliminator drum is constructed in two sections.

In FIG. 23 a still further embodiment of the present invention is disclosed which encompasses the same principle of operation as the embodiment of FIGS. 15 through 22. This embodiment contemplates the use of an extremely large eliminator drum with an outer diameter in the range of possibly 10 to 15 feet. In order to operate such an arrangement efficiently the eliminator drum 260 is formed in two frusto-conical sections, a smaller section 261 and a larger section 262. In this embodiment section 261 is driven by motor 263 which drives sleeve 264 through belt 265 encircling pulleys 266 and 267. Drum 261 is secured to sleeve 264. This will permit eliminator drum 261 to be driven at a first speed. The liquid will be collected in a manner analogous to that described above relative to the preceding figures and will be thrown out radially into annular trough 268 supported in the housing by struts 269'. Trough 268 has a drain 268'. Drum 262 is coupled to shaft 270 which is mounted in bearings 271 and 272. Shaft 270 is driven by motor 273 through the linkage consisting of a belt 274 extending between two spaced pulleys 275 and 276 with the former being secured to shaft 277 mounted in bearings 278 and 279. Shaft 277 in turn drives stub shaft 280 through belt 281 extending between spaced pulleys 282 and 283. Stub shaft 280 is mounted in bearings 278' and 285 and in turn drives shaft 270 through belt 286 extending between pulleys 287 and 288. Fan 289 is secured to shaft 277 and is thus also driven by motor 273.

A suitable annular baffle 290' is located in contiguous relationship to the outer edge 290 of eliminator drum 262 to prevent liquid thrown out therefrom from being carried with the gas stream. The eliminator drums 261 and 262 contain a surface of spaced threads similar to that described above relative to the embodiments of FIGS. 15 to 20, and as these drums 261 and 262 rotate as liquid-containing air is forced therethrough, they will separate the liquid from the gas to thus remove the mist therefrom. As noted above, this multisection eliminator drum is used in application where a single drum cannot be used because the speed of the outer peripheral edge would be so high as to be prohibitive. Thus each section can be driven at its optimum speed for the purpose of effecting efficient elimination. This embodiment is intended to be operated with shaft 270 in an horizontal attitude.

Figure 24:
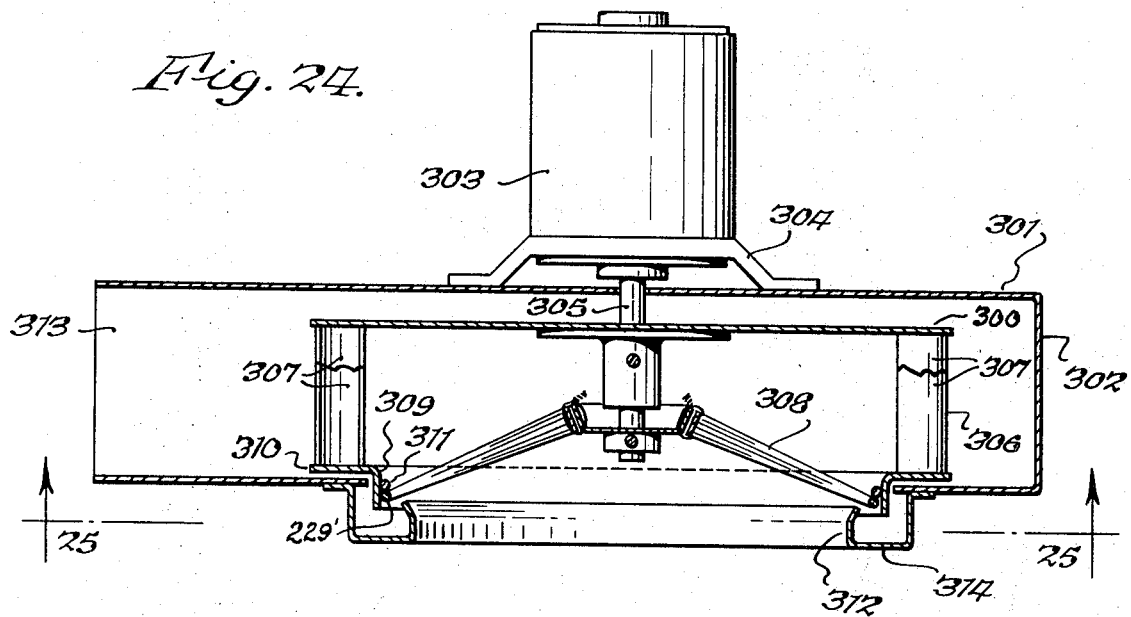
FIG. 24 is a schematic view of a modified form of a device for separating an entrained liquid from a gas wherein the eliminator element and the fan are formed as a unit.
Figure 25:
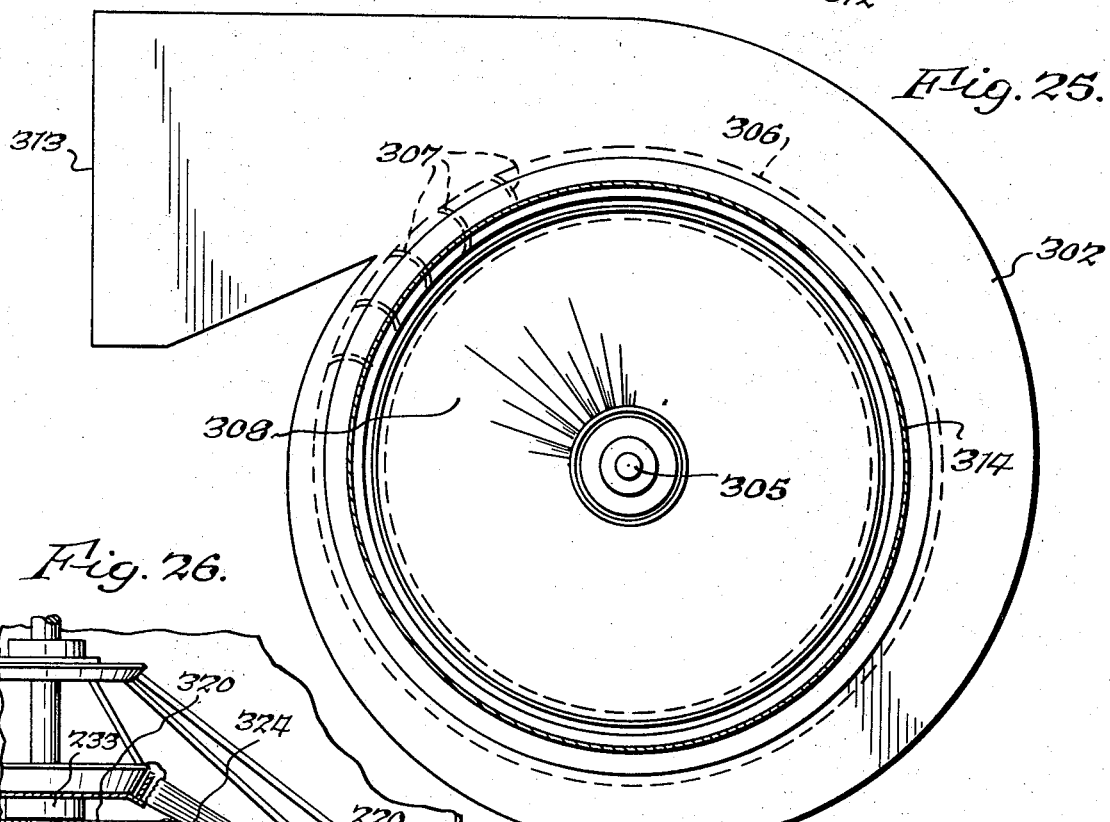
FIG. 25 is a view taken substantially along line 25—25 of FIG. 24, with certain portions of FIG. 24 omitted in the interest of clarity.

In FIGS. 24 and 25 another embodiment of the present invention is disclosed. One of the salient features of this embodiment is that the eliminator element and fan are formed as a unit 300. More specifically, the mist eliminator 301 consists of a scroll type of housing 302 having an electric drive motor 303 suitably mounted thereon by struts 304. Shaft 305 mounts a fan wheel 306 having individual blades 307 thereon. The eliminator element 308 may be identical in all respects to eliminator element 220 described in detail above and is mounted on shaft 305 in the same manner. An annular ring 309 is attached to annular ring 310 which is attached to first ends of blades 307. A ring 311 is fixedly secured to annular ring 309, and ring 229', which is analogous to ring 229 of FIG. 15, bears against ring 311 to hold one end of the eliminator element 308 in position. It will readily be appreciated that when wheel 300 is rotated, blades 307 and eliminator element 308 will cause gas to pass inwardly through fan inlet 312 and this gas will pass through the eliminator element 308 and then out through the spaces between blades 307 and then out of the fan outlet 313. The liquid which is picked up by eliminator element 308 is flung centrifugally outwardly into annular liquid collection trough 314 to which a suitable drain may be attached. This embodiment can be used where a high static pressure is required.

While the foregoing description has generally referred to gas-liquid contact it will be appreciated that the various embodiments of the invention including the embodiments shown in FIGS. 15 through 26 inherently collect the solids carried in a gas. More specifically, where there is sufficient liquid entrained in the gas along with the solids, the wetting of the eliminator element by such entrained liquids will provide sufficient liquid for causing the solid particles in the gas to stick to this element while it rotates and to be flushed therefrom by such liquid. However, in other applications where there is not sufficient liquid entrained in the gas, the eliminator element may be flooded to cause solid particles in the gas to adhere to the collector element. Flooding of this type is shown, for example in FIGS. 11 and 12.

Figure 26:
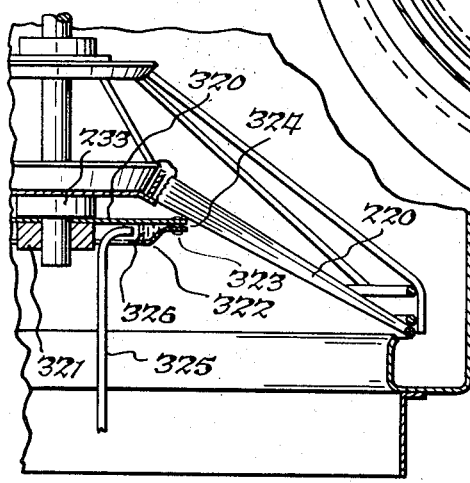
FIG. 26 is a fragmentary view, partially in cross section, similar to FIG. 15 but showing a modification for selectively flooding the eliminator element to prevent the accumulation of foreign matter therein.

Flooding can also be effected by spraying liquid onto the eliminator element from the upstream side of the gas flow. Structure for achieving this is shown in FIG. 26 which shows a drum arrangement which is identical in all respects to that shown in FIG. 15 and therefore a detailed description of the common subject matter will be omitted in the interest of brevity. The only difference between the drums of the two figures resides in the addition of distributor plate 320 between collar 233 and collar 321. Plate 320 is circular and carries an annular ring 322, of the cross sectional configuration shown, on its outer periphery. Ring 322 is attached to plate 320 by a plurality of rivets, or the like, 323 which are mounted in spaced relationship around the periphery of plate 320. Spacers, such as small sleeves, are positioned around each of the rivets so as to provide a small opening 324 between the outer edges of plate 320 and ring 322. A conduit 325 leads from a suitable source of oil or other suitable liquid and conducts this liquid to the space 326 between plate 320 and ring 323 whereupon it is flung outwardly by centrifugal force onto element 220 to provide a flushing thereof. Liquid may be supplied to conduit 325 by a pump from the sump for the lubricating oil of a machine tool, in the event that the mist collector is being used to collect oil. Or, if desired, the liquid for conduit 325 may be supplied from a barrel or other reservoir which is located above the machine and the liquid is fed by gravity. It is to be noted that the opening 324 is sufficiently small so that it meters the oil or other liquid in the proper amounts for the desired flushing action during the rotation of ring 320. Any excess liquid backs up from space 326 and drops into a suitable sump or the like. The pressure at the point of discharge from conduit 325 need be very low inasmuch as it is fed from opening 324 by centrifugal force.

Relative to FIGS. 15-25, elements 231 were described as threads composed of filaments or fibers. In FIGS. 1-14 element 61 and 109 were described as filaments composed of strands. The elements involved were the same in both instances and therefore the terms threads and filaments are synonymous and the terms strands, filaments and fibers are synonymous. Further, stitching 227 and 228, which is also referred to as seams, is preferably applied during the looming process of the element 220.

I claim:

1. A multistage apparatus for contacting a gas and a liquid and eliminating the liquid from the gas comprising an housing, gas inlet means in said housing, a drum, means mounting said drum for rotation in said housing, means for depositing liquid on said drum, combined means on said drum for effecting gas movement through said gas inlet means into said housing and for effecting gas-liquid contact by moving said gas into contact with liquid deposited on said drum, a rotatable member, means mounting said rotatable member for rotation in said housing, filament means mounted on said rotatable member with spaces therebetween for permitting passage of said gas moved by said first drum through said rotatable member while said filament means prevent passage of liquid for effecting the elimination of liquid from said gas passing through said spaces, means on said housing for causing substantially all of said gas moved by said first drum to be conducted through said spaces between said filament means on said rotable member, means for rotating said drum and said rotatable member, and gas outlet means in said housing for permitting said gas which has passed through said filament means to pass from said housing.

2. A multistage apparatus as set forth in claim 1 wherein said first drum includes a shell and wherein said combined means on said first drum comprises radially outwardly extending filaments on said shell.

3. A multistage apparatus as set forth in claim 2 wherein said radially outwardly extending filaments are oriented on said shell in a pattern to form vanes.

4. A multistage apparatus as set forth in claim 2 wherein said shell is perforated and wherein said gas inlet means comprises a gas conduit in communication with the inside of said shell, thereby to cause said gas to pass radially outwardly on said filaments.

5. A multistage apparatus as set forth in claim 4 wherein said means for depositing liquid on said first drum comprises a conduit located within said shell for depositing liquid on the inside thereof whereby both said liquid and said gas pass radially outwardly on said filaments.

6. A multistage apparatus as set forth in claim 1 wherein said rotatable member includes an elongated shell, aperture means in said shell, and wherein said filament means are mounted on said elongated shell overlying said aperture means, and wherein said means on said housing for causing substantially all of said gas to be conducted through said rotatable member comprises a baffle which causes said gas within said housing to pass inwardly into said elongated shell through said filament means and said aperture means.

7. A multisage apparatus as set forth in claim 6 including means for depositing liquid on said elongated shell for providing an additional stage of gas-liquid contact.

8. A multistage apparatus as set forth in claim 1 wherein said rotatable member includes first and second axially spaces bases, a first rim portion on said first base, a second rim portion on said second base, said elongated filament means extending lengthwise between and connecting said first and second rim portions to define the portion of the surface of said elongated shell through which the gas passes.

9. A multistage apparatus as set forth in claim 8 wherein said rotatable member is frusto-conical and wherein said first base is smaller than said second base, and means closing said first base against passage of said gas therethrough.

10. A device for providing gas movement comprising a shell having a surface, aperture means in said shell, filament means and means for mounting said filament means on said shell extending substantially perpendicularly to said surface whereby the rotation of said shell causes gas to move outwardly along said filament means and thereby induces gas to flow through said aperture means from the inside of said shell, said shell including first elongated rib-like members extending in a first direction and second elongated rib-like members extending in a second direction which is transverse to said first direction and said aperture means comprising the spaces between said first and second elongated rib-like members, said drum including a longitudinal axis, first and second ends located in spaced relationship along said axis and wherein said filament means comprises a fringe having a base portion and a free end portion remote from said base portion, means at first and second ends for engaging said base of said fringe, with said fringe being wound in a serpentine manner between said first and second ends to thereby form vanes extending in a substantially axial direction along said drum between said first and second ends.

11. A drum construction as set forth in claim 10 wherein said first elongated rib-like members and said second elongated rib-like members comprise elongated wires.

12. A rotatable device for permitting the passage of a gas therethrough while preventing passage of liquid entrained in said gas comprising a frame having a first portion and a second portion spaced therefrom, with said first portion including a first rim portion and said second portion including a second rim portion, elongated connecting members extending between said first and second rim portions for holding said rim portions in fixed relationship to each other while providing first open spaces therebetween, elongated filament means extending lengthwise between and connecting said first and second rim portions and defining the portion of the surface of said frame through which gas passes, and second open spaces between said elongated filament means in overlying relationship with said first open spaces for permitting the passage of a gas therethrough which also passes through said first open spaces between said elongated connecting members.

13. A rotatable device as set forth in claim 12 wherein said frame comprises an elongated shell having a longitudinal axis, and wherein said first portion of said frame comprises a first base of said shell and wherein said second portion of said frame comprises a second base of said shell which is spaced axially along said axis from said first base, and wherein said rim portions substantially comprise outer edge portions of said first and second bases and wherein said elongated filament means extend generally in an axial direction between said bases.

14. A rotatable device as set forth in claim 13 wherein said shell is frusto-conical with said first base being smaller than said second base.

15. A rotatable device as set forth in claim 14 wherein said shell is fabricated from wire members which extend between said first and second bases, and plate means mounted on and forming said smaller base for preventing entry of gas into said shell through the end at which said plate is located.

16. A rotatable device as set forth in claim 15 including means on said smaller base for guiding liquid from a location relatively centrally on said plate means onto said elongated filament means.

17. A rotatable device as set forth in claim 13 wherein said filament means comprise multifilament strands.

18. A device for eliminating entrained liquid from a gas comprising a housing, a gas inlet in said housing, a gas outlet in said housing, eliminator means including frame means having first and second spaced portions, a plurality of elongated liquid collecting threads having longitudinal axes and being mounted between and having opposite ends affixed to said spaced portions of said frame means to form a fabric, said elongated threads being substantially uniformly spaced to provide elongated spaces in said fabric between said threads extending in the direction of said longitudinal axes, means in said housing for directing flow of said gas through said elongated spaces between said liquid collecting threads, motor means for rotating said eliminator means at a sufficiently high speed to cause said liquid collecting threads to contact said entrained liquid in said gas passing through said elongated spaces to thus collect said entrained liquid while permitting said gas with said entrained liquid removed therefrom to pass through said elongated spaces between said liquid collecting threads, said first portion of said frame means being located radially outwardly of said second portion of said frame means, said elongated spaces between said threads providing unimpeded expanses for liquid flow outwardly along said threads as well as permitting unimpeded flow of said gas through said elongated spaces between said threads, said first portion of said frame comprising a first rim and said second portion of said frame comprising a second rim of lesser diameter than said first rim and wherein said fabric extends between said first and second rims and wherein the portion of said fabric located proximate said second rim is effectively pleated to compensate for the difference in diameter of said first and second rims.

19. A device for eliminating entrained liquid from a gas comprising a housing, a gas inlet in said housing, a gas outlet in said housing, eliminator means including frame means having first and second spaced portions, a plurality of elongated liquid collecting threads having longitudinal axes and being mounted between and having opposite ends affixed to said spaced portions of said frame means, elongated spaces between said threads extending in the direction of said longitudinal axes, means in said housing for directing flow of said gas through said elongated spaces between said liquid collecting threads, motor means for rotating said eliminator means at a sufficiently high speed to cause said liquid collecting threads to contact said entrained liquid in said gas passing through said elongated spaces to thus collect said entrained liquid while permitting said gas with said entrained liquid removed therefrom to pass through said elongated spaces between said liquid collecting threads, said first portion of said frame means being located radially outwardly of said second portion of said frame means, said elongated spaces between said threads providing unimpeded expanses for liquid flow outwardly along said threads as well as permitting unimpeded flow of said gas through said elongated spaces between said threads, and means mounted relative to said frame means for adjusting the tension of said threads, a shaft driven by said motor means and mounting said frame means, and said means for adjusting the tension of said thread comprising means for permitting relative movement between said first and second spaced portions of said frame thereby to vary the spacing between said first and second portions, and means for securing said first and second spaced portions of said frame means relative to each other in an adjusted position.

20. A device for eliminating entrained liquid from a gas comprising a housing, a gas inlet in said housing, a gas outlet in said housing, eliminator means including frame means having first and second spaced portions, a plurality of elongated liquid collecting threads having longitudinal axes and being mounted between and having opposite ends affixed to said spaced portions of said frame means, elongated spaces between said threads extending in the direction of said longitudinal axes, means in said housing for directing flow of said gas through said elongated spaces between said liquid collecting threads, motor means for rotating said eliminator means at a sufficiently high speed to cause said liquid collecting threads to contact said entrained liquid in said gas passing through said elongated spaces to thus collect said entrained liquid while permitting said gas with said entrained liquid removed therefrom to pass through said elongated spaces between said liquid collecting threads, and stationary antisplash means fixed to said housing and located proximate to and surrrounding said elongated liquid collecting threads for receiving collected liquid which is flung centrifugally from said liquid collecting threads for preventing said collected liquid from being reentrained into said gas and means for conducting said collected liquid from said housing.

21. A device for eliminating entrained liquid from a gas comprising a housing, a gas inlet in said housing, a gas outlet in said housing, eliminator means including frame means having first and second spaced portions, a plurality of elongated liquid collecting threads having longitudinal axes and being mounted between and having opposite ends affixed to said spaced portions of said frame means, elongated spaces between said threads extending in the direction of said longitudinal axes, means in said housing for directing flow of said gas through said elongated spaces between said liquid collecting threads, motor means for rotating said eliminator means at a sufficiently high speed to cause said liquid collecting threads to contact said entrained liquid in said gas passing through said elongated spaces to thus collect said entrained liquid while permitting said gas with said entrained liquid removed therefrom to pass through said elongated spaces between said liquid collecting threads, said first portion of said frame means being located radially outwardly of said second portion of said frame means, said elongated spaces between said threads providing unimpeded expanses for liquid flow outwardly along said threads as well as permitting unimpeded flow of said gas through said elongated spaces between threads, said threads individually being of multifilament construction for enhancing the retention of liquid contacted thereby and permitting the flow of said liquid lengthwise through said threads as well as along said threads.

22. A device for eliminating entrained liquid from a gas as set forth in claim 21 including fan means mounted in said housing for moving said gas therethrough.

23. An element for separating an entrained liquid from a gas comprising first and second spaced rings of different diameter, a plurality of elongated liquid collecting threads having their longitudinal axes extending lengthwise toward said first and second rings and being attached thereto, and elongated spaces between said elongated liquid collecting threads extending in the direction of said longitudinal axes, said threads being individually of multifilament construction for enhancing liquid retention and conducting the liquid toward said larger ring during rotation of said element.

24. A device for eliminating entrained liquid from a gas comprising a housing, a gas inlet in said housing, a gas oulet in said housing, eliminator means including frame means having first and second spaced portions, a plurality of elongated liquid collecting threads having longitudinal axes and being mounted between and having opposite ends affixed to said spaced portions of said frame means, elongated spaces between said threads extending in the direction of said longitudinal axes, means in said housing for directing flow of said gas through said elongated spaces between said liquid collecting threads, motor means for rotating said eliminator means at a sufficiently high speed to cause said liquid collecting threads to contact said entrained liquid in said gas passing through said elongated spaces to thus collect said entrained liquid while permitting said gas with said entrained liquid removed therefrom to pass through said elongated spaces between said liquid collecting threads, said first portion of said frame means being located radially outwardly of said second portion of said frame means, said elongated spaces between said threads providing unimpeded expanses for liquid flow outwardly along said threads as well as permitting unimpeded flow of said gas through said elongated spaces between said threads, said threads being oriented in a frusto-conical configuration between said spaced portions of said frame, and said threads individually being of multifilament construction for enhancing the retention of liquid contacted thereby and permitting the flow of said liquid therethrough.

25. A device for eliminating entrained liquid from a gas comprising a housing, a gas inlet in said housing, a gas outlet in said housing, eliminator means including frame means having first and second spaced portions, a plurality of elongated liquid collecting threads having longitudinal axes and being mounted between and having opposite ends affixed to said spaced portions of said frame means, elongated spaces between said threads extending in the direction of said longitudinal axes, means in said housing for directing flow of said gas through said elongated spaces between said liquid collecting threads, motor means for rotating said eliminator means at a sufficiently high speed to cause said liquid collecting threads to contact said entrained liquid in said gas passing through said elongated spaces to thus collect said entrained liquid while permitting said gas with said entrained liquid removed therefrom to pass through said elongated spaces between said liquid collecting threads, said motor means including a shaft, and wherein said frame means includes a first hub mounted on said shaft, a plurality of spoke-like members having first ends attached to said first hub and having spaces therebetween, means connecting the second ends of said spoke-like members, a second hub mounted on said shaft in spaced relationship to said first hub, and wherein one of said spaced portions comprises means on said second hub for mounting said first end portions of said elongated threads, and wherein another of said spaced portions comprises means for mounting said second end portions of said elongated threads relative to said elongated spoke-like members.

26. A device for eliminating entrained liquid from a gas comprising a housing, a gas inlet in said housing, a gas outlet in said housing, eliminator means including a frame, a plurality of elongated liquid collecting members having longitudinal axes and having spaces therebetween mounted on said frame, means in said housing for directing flow of substantially all of said gas through said spaces between said liquid collecting members, and motor means for rotating said eliminator means at a sufficiently high speed to cause said liquid collecting members to contact said entrained liquid in said gas passing through said spaces and thus collect said entrained liquid while permitting said gas with said entrained liquid removed therefrom to pass through said spaces between said liquid collecting members, said eliminator means comprising a pair of frusto-conical members forming continuations of each other, and said motor means comprising means for driving each of said frusto-conical members at different rotational speeds.

27. A replacement element for separating an entrained liquid from a gas comprising first and second spaced rings of different diameter, a plurality of elongated liquid collecting members having their longitudinal axes extending lengthwise toward said first and second members and being attached thereto, and spaces between said elongated liquid collecting members, said elongated collecting members comprising threads, and said threads being formed into a fabric which is folded over at its mid-point and said mid-point being located at said first ring and wherein said side edges are attached to said second ring.

References Cited

UNITED STATES PATENTS

| | | | |
|---|---|---|---|
| 86,320 | 1/1869 | Golay et al. | 55—400 X |
| 585,188 | 6/1897 | Davis | 55—400 |
| 1,218,354 | 1/1917 | Baldwin | 55—408 X |
| 1,420,665 | 6/1922 | Newcombe | 55—408 |
| 1,854,677 | 4/1932 | Umensetter | 55—491 X |
| 2,394,208 | 2/1946 | Schaaf | 55—489 |
| 2,398,233 | 4/1946 | Lincoln | 55—401 X |
| 2,718,933 | 9/1955 | Norbom | 55—409 X |
| 2,788,860 | 4/1957 | Turner | 55—400 |
| 2,989,146 | 6/1961 | Lundy | 55—408 X |
| 3,062,379 | 11/1962 | Bryan | 55—528 |
| 3,218,048 | 11/1965 | Smith, et al. | 261—94 |
| 3,385,033 | 5/1968 | Basore et al. | 55—511 X |
| 3,410,061 | 11/1968 | Knight | 55—381 X |
| 3,439,477 | 4/1969 | Pyne et al. | 55—231 |

FOREIGN PATENTS

| | | |
|---|---|---|
| 1,203,718 | 1/1960 | France. |
| 724,377 | 2/1955 | Great Britain. |
| 754,262 | 8/1956 | Great Britain. |
| 873,111 | 7/1961 | Great Britain. |

TIM R. MILES, Primary Examiner

U.S. Cl. X.R.

55—259, 408, 477, 487, 511, 527; 230—127; 261—18, 89